United States Patent
Yan

(10) Patent No.: US 10,855,586 B2
(45) Date of Patent: Dec. 1, 2020

(54) PACKET PROCESSING METHOD AND SYSTEM, AND DEVICE

(71) Applicant: Huawei Technologies Co., Ltd., Shenzhen (CN)

(72) Inventor: Changjiang Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 16/120,014

(22) Filed: Aug. 31, 2018

(65) Prior Publication Data

US 2019/0020584 A1 Jan. 17, 2019

Related U.S. Application Data

(60) Division of application No. 14/854,872, filed on Sep. 15, 2015, now Pat. No. 10,084,702, which is a
(Continued)

(51) Int. Cl.
*H04L 12/741* (2013.01)
*H04L 12/721* (2013.01)
*H04L 12/725* (2013.01)
*H04L 12/715* (2013.01)
*H04L 12/723* (2013.01)
(Continued)

(52) U.S. Cl.
CPC ............ *H04L 45/74* (2013.01); *H04L 45/306* (2013.01); *H04L 45/38* (2013.01); *H04L 45/50* (2013.01); *H04L 45/64* (2013.01); *H04L 45/66* (2013.01); *H04L 47/19* (2013.01); *H04L 61/2007* (2013.01); *H04L 61/6022* (2013.01)

(58) Field of Classification Search
None
See application file for complete search history.

(56) References Cited

U.S. PATENT DOCUMENTS 7,930,740 B2  4/2011  Davis et al.
8,948,174 B2  2/2015  Szyszko et al.
(Continued)

FOREIGN PATENT DOCUMENTS

CN  101060653 A  10/2007
CN  101188537 A  5/2008
(Continued)

*Primary Examiner* — Donald L Mills
(74) *Attorney, Agent, or Firm* — Slater Matsil, LLP

(57) ABSTRACT

The application disclose a packet processing method that includes: receiving, by a service distribution node, service routing information sent by a controller, where the service routing information includes a flow identifier, a service identifier, and a next-hop address, the flow identifier is used to identify a packet flow, the service identifier is used to identify a sequence of a service node instance that processes the packet flow, and the next-hop address is used to identify the service node instance that processes the packet flow; receiving a first packet; acquiring a first flow identifier according to the first packet, and searching the service routing information according to the first flow identifier to acquire a matched service identifier and a matched next-hop address; and sending a second packet to a first service node instance that has the matched next-hop address, which implements service processing on a packet flow.

12 Claims, 5 Drawing Sheets

Related U.S. Application Data continuation of application No. PCT/CN2013/072724, filed on Mar. 15, 2013.

(51) Int. Cl.
*H04L 12/801* (2013.01)
*H04L 29/12* (2006.01)

(56) References Cited

U.S. PATENT DOCUMENTS

| | | |
|---|---|---|
| 9,104,492 B2 | 8/2015 | Gember et al. |
| 9,304,801 B2 | 4/2016 | Koorevaar et al. |
| 9,379,931 B2 | 6/2016 | Bosch et al. |
| 10,367,730 B2 * | 7/2019 | Dunbar ............... H04L 45/74 |
| 2010/0178040 A1 | 7/2010 | Yamada et al. |
| 2011/0299538 A1 * | 12/2011 | Maruta ............ H04L 12/4625 370/392 |
| 2012/0027016 A1 * | 2/2012 | Filsfils ................. H04L 45/30 370/392 |
| 2012/0257608 A1 * | 10/2012 | Masputra ............. H04L 45/00 370/338 |
| 2012/0314593 A1 | 12/2012 | Liu |
| 2012/0327811 A1 * | 12/2012 | Nozaki ............... H04L 12/462 370/255 |
| 2013/0003735 A1 | 1/2013 | Chao et al. |
| 2014/0092738 A1 | 4/2014 | Grandhi et al. |
| 2014/0254374 A1 | 9/2014 | Janakiraman et al. |
| 2016/0094667 A1 | 3/2016 | Jani |

FOREIGN PATENT DOCUMENTS

| | | |
|---|---|---|
| CN | 102209020 A | 10/2011 |
| CN | 102377602 A | 3/2012 |

* cited by examiner

PACKET PROCESSING METHOD AND SYSTEM, AND DEVICE

CROSS-REFERENCE TO RELATED APPLICATIONS

This application is a divisional of U.S. patent application Ser. No. 14/854,872, filed on Sep. 15, 2015, which is a continuation of International Application No. PCT/CN2013/072724, filed on Mar. 15, 2013. Both of the aforementioned applications are hereby incorporated by reference in their entireties.

TECHNICAL FIELD

The application relates to the communications field, and in particular, to a packet processing method and system, and a device.

BACKGROUND

On a data center network, service processing based on open systems interconnection (OSI) layer 4 to layer 7 usually needs to be performed on a packet flow. For example, service processing generally includes: providing processing of a firewall, network address translation (NAT), home control, and the like. Different service processing may need to be provided for different packet flows. In addition, generally, not one type of service processing is performed on a packet flow, but multiple types of service processing need to be provided for the packet flow. For example, firewall processing and NAT processing may need to be performed on some packet flows, and firewall processing and home control processing may be expected for some other packet flows. In this case, how to implement service processing on a packet flow is an issue to be resolved.

SUMMARY

Embodiments of the application provide a packet processing method, device, and system, which can implement service processing on a packet flow, and in particular, implement efficient multiple types of service processing on a packet flow.

To achieve the foregoing objective, the following technical solutions are adopted in the embodiments of the application.

According to a first aspect, an embodiment of the application provides a packet processing method. The method includes receiving, by a service distribution node, service routing information sent by a controller, where the service routing information includes a flow identifier, a service identifier, and a next-hop address. The flow identifier is used to identify a packet flow, the service identifier is used to identify a sequence of a service node instance that processes the packet flow, and the next-hop address is used to identify the service node instance that processes the packet flow. The method also includes receiving, by the service distribution node, a first packet. The method also includes acquiring, by the service distribution node, a first flow identifier according to the first packet, and searching the service routing information according to the first flow identifier to acquire a matched service identifier and a matched next-hop address. The method also includes sending, by the service distribution node, a second packet to a first service node instance that has the matched next-hop address, where the second packet is formed by adding the matched service identifier to the first packet.

With reference to the first aspect, in a first possible implementation manner, the next-hop address is a next-hop MAC address or a next-hop IP address.

According to a second aspect, an embodiment of the application provides a packet processing method. The method includes receiving, by a first service node instance, service routing information sent by a controller. The service routing information includes a service identifier and a next-hop address, and the service identifier is used to identify a sequence of a service node instance that processes a packet flow. The method also includes receiving, by the first service node instance, a first packet sent by a service distribution node, where the first packet carries a service identifier that matches the first packet. The method also includes processing, by the first service node instance, the first packet to form a second packet, where the second packet carries the service identifier that matches the first packet. The method also includes searching, by the first service node instance, the service routing information according to the service identifier that matches the first packet to acquire a first next-hop address, where the first next-hop address is a next-hop address that matches the service identifier matching the first packet. If the first next-hop address is a reachable address, the method also includes sending, by the first service node instance, the second packet to a device that has the first next-hop address.

With reference to the second aspect, in a first possible implementation manner, the first packet is a first IP packet, the first next-hop address is a first next-hop IP address, and the sending, by the first service node instance, the second packet to a device that has the first next-hop address includes: searching, by the first service node instance, an ARP table according to the first next-hop IP address to acquire a first MAC address, where the first MAC address is a MAC address that matches the first next-hop IP address; using, by the first service node instance, the first MAC address as a destination MAC address to perform Ethernet encapsulation on the second packet to form a first Ethernet packet; and sending, by the first service node instance, the first Ethernet packet to a device that has the first MAC address.

With reference to the second aspect, in a second possible implementation manner, the first packet is a first Ethernet packet, the first next-hop address is a first next-hop IP address, and the sending, by the first service node instance, the second packet to a device that has the first next-hop address includes: searching, by the first service node instance, an ARP table according to the first next-hop IP address to acquire a first MAC address, where the first MAC address is a MAC address that matches the first next-hop IP address; replacing, by the first service node instance, a destination MAC address in the second packet with the first MAC address to form a second Ethernet packet; and sending, by the first service node instance, the second Ethernet packet to a device that has the first MAC address.

With reference to the second aspect and the foregoing possible implementation manners, in a third possible implementation manner, the first packet is a first IP packet, the first next-hop address is a first next-hop MAC address, and the sending, by the first service node instance, the second packet to a device that has the first next-hop address includes: using, by the first service node instance, the first next-hop MAC address as a destination MAC address to perform Ethernet encapsulation on the second packet to form a third Ethernet packet; and sending, by the first service node instance, the third Ethernet packet to a device that has the first next-hop MAC address.

With reference to the second aspect and the foregoing possible implementation manners, in a fourth possible implementation manner, the first packet is a first Ethernet packet, the first next-hop address is a first next-hop MAC address, and the sending, by the first service node instance, the second packet to a device that has the first next-hop address includes: replacing, by the first service node instance, a destination MAC address in the second packet with the first next-hop MAC address to form a fourth Ethernet packet; and sending, by the first service node instance, the fourth Ethernet packet to a device that has the first next-hop MAC address.

With reference to the second aspect and the foregoing possible implementation manners, in a fifth possible implementation manner, the method further includes: if the first next-hop address is an unreachable IP address, searching, by the first service node instance, a routing table according to a destination IP address in the second packet to acquire a second next-hop IP address, where the second next-hop IP address is a next-hop IP address that is in the routing table and matches the destination IP address; and sending, by the first service node instance, a third packet to a device that has the second next-hop IP address, where the third packet is formed by removing the service identifier that matches the first packet and is carried in the second packet.

With reference to the second aspect and the foregoing possible implementation manners, in a sixth possible implementation manner, the first packet is a first IP packet, and the sending, by the first service node instance, a third packet to a device that has the second next-hop IP address includes: searching, by the first service node instance, an ARP table according to the second next-hop IP address to acquire a first MAC address, where the first MAC address is a MAC address that matches the second next-hop IP address; using, by the first service node instance, the first MAC address as a destination MAC address to perform Ethernet encapsulation on the third packet to form a fifth Ethernet packet; and sending, by the first service node instance, the fifth Ethernet packet to a device that has the first MAC address.

With reference to the second aspect and the foregoing possible implementation manners, in a seventh possible implementation manner, the first packet is a first Ethernet packet, and the sending, by the first service node instance, a third packet to a device that has the second next-hop IP address includes: searching, by the first service node instance, an ARP table according to the second next-hop IP address to acquire a first MAC address, where the first MAC address is a MAC address that matches the second next-hop IP address; replacing, by the first service node instance, a destination MAC address in the third packet with the first MAC address to form a sixth Ethernet packet; and sending, by the first service node instance, the sixth Ethernet packet to a device that has the first MAC address.

With reference to the second aspect and the foregoing possible implementation manners, in an eighth possible implementation manner, the first packet is an IP packet, the first next-hop address is a first next-hop MAC address, and the method further includes: if the first next-hop MAC address is an unreachable MAC address, searching, by the first service node instance, a routing table according to a destination IP address in the second packet to acquire a second next-hop IP address, where the second next-hop IP address is a next-hop IP address that matches the destination IP address; searching, by the first service node instance, an ARP table to acquire a first MAC address, where the first MAC address is a MAC address that matches the second next-hop IP address; using, by the first service node instance, the first MAC address as a destination MAC address to perform Ethernet encapsulation on the second packet to form a seventh Ethernet packet, where the seventh Ethernet packet does not carry the service identifier that matches the first packet; and sending, by the first service node instance, the seventh Ethernet packet to a device that has the first MAC address.

With reference to the second aspect and the foregoing possible implementation manners, in a ninth possible implementation manner, the first packet is an Ethernet packet, the first next-hop address is a first next-hop MAC address, and the method further includes: if the first next-hop MAC address is an unreachable MAC address, searching, by the first service node instance, a routing table according to a destination IP address in the second packet to acquire a second next-hop IP address, where the second next-hop IP address is a next-hop IP address that matches the destination IP address; searching, by the first service node instance, an ARP table to acquire a first MAC address, where the first MAC address is a MAC address that matches the second next-hop IP address; and replacing, by the first service node instance, a MAC address in the second packet with the first MAC address to form an eighth Ethernet packet, where the eighth Ethernet packet does not carry the service identifier that matches the first packet; and sending, by the first service node instance, the eighth Ethernet packet to a device that has the first MAC address.

With reference to the second aspect and the foregoing possible implementation manners, in a tenth possible implementation manner, the service routing information further includes control flag information, the control flag information is used to indicate whether the packet flow has reached the last service node instance and whether normal routing and forwarding need to be performed, and the method further includes: searching, by the first service node instance, the service routing information to acquire matched control flag information; and if the matched control flag information indicates that the first packet has reached the last service node instance and normal routing and forwarding need to be performed, the sending, by the first service node instance, the second packet to a device that has the first next-hop address includes: sending, by the first service node instance, a fourth packet to the device that has the first next-hop address, where the fourth packet is formed by removing the service identifier that matches the first packet and is carried in the second packet.

With reference to the second aspect and the foregoing possible implementation manners, in an eleventh possible implementation manner, the first packet is a first IP packet, the first next-hop address is a first next-hop IP address, and the sending, by the first service node instance, a fourth packet to the device that has the first next-hop address includes: searching, by the first service node instance, an ARP table according to the first next-hop IP address to acquire a second MAC address, where the second MAC address is a MAC address that matches the first next-hop IP address; using, by the first service node instance, the second MAC address as a destination MAC address to perform Ethernet encapsulation on the fourth packet to form a ninth Ethernet packet; and sending, by the first service node instance, the ninth Ethernet packet to a device that has the second MAC address.

With reference to the second aspect and the foregoing possible implementation manners, in a twelfth possible implementation manner, the first packet is a first Ethernet packet, the first next-hop address is a first next-hop IP address, and the sending, by the first service node instance, a fourth packet to the device that has the first next-hop address includes: searching, by the first service node instance, an ARP table according to the first next-hop IP address to acquire a second MAC address, where the second MAC address is a MAC address that matches the first next-hop IP address; replacing, by the first service node instance, a destination MAC address in the fourth packet with the second MAC address to form a tenth Ethernet packet; and sending, by the first service node instance, the tenth Ethernet packet to a device that has the second MAC address.

With reference to the second aspect and the foregoing possible implementation manners, in a thirteenth possible implementation manner, the first packet is an IP packet, the first next-hop address is a first next-hop MAC address, and the sending, by the first service node instance, a fourth packet to the device that has the first next-hop address includes: using, by the first service node instance, the first next-hop MAC address as a destination address to perform Ethernet encapsulation on the fourth packet to form an eleventh Ethernet packet; and sending, by the first service node instance, the eleventh Ethernet packet to a device that has the first next-hop MAC address.

With reference to the second aspect and the foregoing possible implementation manners, in a fourteenth possible implementation manner, the first packet is an Ethernet packet, the first next-hop address is a first next-hop MAC address, and the sending, by the first service node instance, a fourth packet to the device that has the first next-hop address includes: replacing, by the first service node instance, a destination MAC address in the second packet with the first next-hop MAC address to form a twelfth Ethernet packet; and sending, by the first service node instance, the twelfth Ethernet packet to a device that has the first next-hop MAC address.

According to a third aspect, an embodiment of the application provides a service distribution node, where the service distribution node includes a receiving unit, a processing unit, and a sending unit. The receiving unit is configured to receive service routing information sent by a controller, where the service routing information includes a flow identifier, a service identifier, and a next-hop address. The flow identifier is used to identify a packet flow, the service identifier is used to identify a sequence of a service node instance that processes the packet flow, and the next-hop address is used to identify the service node instance that processes the packet flow. The receiving unit is further configured to receive a first packet. The processing unit is configured to: acquire a first flow identifier according to the first packet, and search the service routing information according to the first flow identifier to acquire a matched service identifier and a matched next-hop address; and trigger the sending unit to send a second packet to a first service node instance that has the matched next-hop address, where the second packet is formed by adding the matched service identifier to the first packet; and the sending unit is configured to send the second packet to the first service node instance that has the matched next-hop address.

According to a fourth aspect, an embodiment of the application provides a service node instance, where the service node instance includes a receiving unit, a processing unit, and a sending unit. The receiving unit is configured to receive service routing information sent by a controller, where the service routing information includes a service identifier and a next-hop address, and the service identifier is used to identify a sequence of a service node instance that processes a packet flow. The receiving unit is further configured to receive a first packet sent by a service distribution node, where the first packet carries a service identifier that matches the first packet. The processing unit is configured to: process the first packet to form a second packet, where the second packet carries the service identifier that matches the first packet; search the service routing information according to the service identifier that matches the first packet to acquire a first next-hop address, where the first next-hop address is a next-hop address that matches the service identifier matching the first packet; and if the first next-hop address is a reachable address, trigger the sending unit to send the second packet to a device that has the first next-hop address; and the sending unit is configured to send the second packet to the device that has the first next-hop address.

With reference to the fourth aspect, in a first possible implementation manner, the first packet is a first IP packet, the first next-hop address is a first next-hop IP address, and that the processing unit triggers the sending unit to send the second packet to the device that has the first next-hop address includes: the processing unit searches an ARP table according to the first next-hop IP address to acquire a first MAC address, where the first MAC address is a MAC address that matches the first next-hop IP address; the processing unit uses the first MAC address as a destination MAC address to perform Ethernet encapsulation on the second packet to form a first Ethernet packet; and the processing unit triggers the sending unit to send the first Ethernet packet to a device that has the first MAC address; and correspondingly, that the sending unit is configured to send the second packet to the device that has the first next-hop address includes: the sending unit is configured to send the first Ethernet packet to the device that has the first MAC address.

With reference to the fourth aspect, in a second possible implementation manner, the first packet is a first Ethernet packet, the first next-hop address is a first next-hop IP address, and that the processing unit triggers the sending unit to send the second packet to the device that has the first next-hop address includes: the processing unit searches an ARP table according to the first next-hop IP address to acquire a first MAC address, where the first MAC address is a MAC address that matches the first next-hop IP address; the processing unit replaces a destination MAC address in the second packet with the first MAC address to form a second Ethernet packet; and the processing unit triggers the sending unit to send the second Ethernet packet to a device that has the first MAC address; and correspondingly, that the sending unit is configured to send the second packet to the device that has the first next-hop address includes: the sending unit is configured to send the second Ethernet packet to the device that has the first MAC address.

With reference to the fourth aspect and the foregoing possible implementation manners, in a third possible implementation manner, the first packet is a first IP packet, the first next-hop address is a first next-hop MAC address, and that the processing unit triggers the sending unit to send the second packet to the device that has the first next-hop address includes: the processing unit uses the first next-hop MAC address as a destination MAC address to perform Ethernet encapsulation on the second packet to form a third Ethernet packet; and the processing unit triggers the sending unit to send the third Ethernet packet to a device that has the first next-hop MAC address; and correspondingly, that the sending unit is configured to send the second packet to the device that has the first next-hop address includes: the sending unit is configured to send the third Ethernet packet to the device that has the first next-hop MAC address.

With reference to the fourth aspect and the foregoing possible implementation manners, in a fourth possible implementation manner, the first packet is a first Ethernet packet, the first next-hop address is a first next-hop MAC address, and that the processing unit triggers the sending unit to send the second packet to the device that has the first next-hop address includes: the processing unit replaces a destination MAC address in the second packet with the first next-hop MAC address to form a fourth Ethernet packet; and the processing unit triggers the sending unit to send the fourth Ethernet packet to a device that has the first next-hop MAC address; and correspondingly, that the sending unit is configured to send the second packet to the device that has the first next-hop address includes: the sending unit is configured to send the fourth Ethernet packet to the device that has the first next-hop MAC address.

With reference to the fourth aspect and the foregoing possible implementation manners, in a fifth possible implementation manner, the processing unit is further configured to: if the first next-hop address is an unreachable IP address, search a routing table according to a destination IP address in the second packet to acquire a second next-hop IP address, where the second next-hop IP address is a next-hop IP address that is in the routing table and matches the destination IP address; and trigger the sending unit to send a third packet to a device that has the second next-hop IP address, where the third packet is formed by removing the service identifier that matches the first packet and is carried in the second packet; and correspondingly, the sending unit is further configured to send the third packet to the device that has the second next-hop IP address.

With reference to the fourth aspect and the foregoing possible implementation manners, in a sixth possible implementation manner, the first packet is a first IP packet, and that the processing unit triggers the sending unit to send the third packet to the device that has the second next-hop IP address includes: the processing unit searches an ARP table according to the second next-hop IP address to acquire a first MAC address, where the first MAC address is a MAC address that matches the second next-hop IP address; the processing unit uses the first MAC address as a destination MAC address to perform Ethernet encapsulation on the third packet to form a fifth Ethernet packet; and the processing unit triggers the sending unit to send the fifth Ethernet packet to a device that has the first MAC address; and correspondingly, that the sending unit is further configured to send the third packet to the device that has the second next-hop IP address includes: the sending unit is further configured to send the fifth Ethernet packet to the device that has the first MAC address.

With reference to the fourth aspect and the foregoing possible implementation manners, in a seventh possible implementation manner, the first packet is a first Ethernet packet, and that the processing unit triggers the sending unit to send the third packet to the device that has the second next-hop IP address includes: the processing unit searches an ARP table according to the second next-hop IP address to acquire a first MAC address, where the first MAC address is a MAC address that matches the second next-hop IP address; the processing unit replaces a destination MAC address in the third packet with the first MAC address to form a sixth Ethernet packet; and the processing unit triggers the sending unit to send the sixth Ethernet packet to a device that has the first MAC address; and correspondingly, that the sending unit is further configured to send the third packet to the device that has the second next-hop IP address includes: the sending unit sends the sixth Ethernet packet to the device that has the first MAC address.

With reference to the fourth aspect and the foregoing possible implementation manners, in an eighth possible implementation manner, the first packet is an IP packet, the first next-hop address is a first next-hop MAC address, and the processing unit is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; use the first MAC address as a destination MAC address to perform Ethernet encapsulation on the second packet to form a seventh Ethernet packet, where the seventh Ethernet packet does not carry the service identifier that matches the first packet; and trigger the sending unit to send the seventh Ethernet packet to a device that has the first MAC address; and correspondingly, the sending unit is further configured to send the seventh Ethernet packet to the device that has the first MAC address.

With reference to the fourth aspect and the foregoing possible implementation manners, in a ninth possible implementation manner, the first packet is an Ethernet packet, the first next-hop address is a first next-hop MAC address, and the processing unit is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; replace a MAC address in the second packet with the first MAC address to form an eighth Ethernet packet, where the eighth Ethernet packet does not carry the service identifier that matches the first packet; and trigger the sending unit to send the eighth Ethernet packet to a device that has the first MAC address; and correspondingly, the sending unit is further configured to send the eighth Ethernet packet to the device that has the first MAC address.

With reference to the fourth aspect and the foregoing possible implementation manners, in a tenth possible implementation manner, the service routing information further includes control flag information, the control flag information is used to indicate whether the packet flow has reached the last service node instance and whether normal routing and forwarding need to be performed, and the processing unit is further configured to: when searching the service routing information, acquire matched control flag information; and if the matched control flag information indicates that the first packet has reached the last service node instance and normal routing and forwarding need to be performed, trigger the sending unit to send a fourth packet to the device that has the first next-hop address, where the fourth packet is formed by removing the service identifier that matches the first packet and is carried in the second packet; and correspondingly, the sending unit is further configured to send the fourth packet to the device that has the first next-hop address.

With reference to the fourth aspect and the foregoing possible implementation manners, in an eleventh possible implementation manner, the first packet is a first IP packet, the first next-hop address is a first next-hop IP address, and that the processing unit triggers the sending unit to send the fourth packet to the device that has the first next-hop address includes: the processing unit searches an ARP table according to the first next-hop IP address to acquire a second MAC address, where the second MAC address is a MAC address that matches the first next-hop IP address; uses the second MAC address as a destination MAC address to perform Ethernet encapsulation on the fourth packet to form a ninth Ethernet packet; and triggers the sending unit to send the ninth Ethernet packet to a device that has the second MAC address; and correspondingly, that the sending unit is further configured to send the fourth packet to the device that has the first next-hop address includes: the sending unit is further configured to send the ninth Ethernet packet to the device that has the second MAC address.

With reference to the fourth aspect and the foregoing possible implementation manners, in a twelfth possible implementation manner, the first packet is a first Ethernet packet, the first next-hop address is a first next-hop IP address, and that the processing unit triggers the sending unit to send the fourth packet to the device that has the first next-hop address includes: the processing unit searches an ARP table according to the first next-hop IP address to acquire a second MAC address, where the second MAC address is a MAC address that matches the first next-hop IP address; replaces a destination MAC address in the fourth packet with the second MAC address to form a tenth Ethernet packet; and triggers the sending unit to send the tenth Ethernet packet to a device that has the second MAC address; and correspondingly, that the sending unit is further configured to send the fourth packet to the device that has the first next-hop address includes: the sending unit is further configured to send the tenth Ethernet packet to the device that has the second MAC address.

With reference to the fourth aspect and the foregoing possible implementation manners, in a thirteenth possible implementation manner, the first packet is an IP packet, the first next-hop address is a first next-hop MAC address, and that the processing unit triggers the sending unit to send the fourth packet to the device that has the first next-hop address includes: the processing unit uses the first next-hop MAC address as a destination address to perform Ethernet encapsulation on the fourth packet to form an eleventh Ethernet packet; and triggers the sending unit to send the eleventh Ethernet packet to a device that has the first next-hop MAC address; and correspondingly, that the sending unit is further configured to send the fourth packet to the device that has the first next-hop address includes: the sending unit is further configured to send the eleventh Ethernet packet to the device that has the first next-hop MAC address.

With reference to the fourth aspect and the foregoing possible implementation manners, in a fourteenth possible implementation manner, the first packet is an Ethernet packet, the first next-hop address is a first next-hop MAC address, and that the processing unit triggers the sending unit to send the fourth packet to the device that has the first next-hop address includes: the processing unit replaces a destination MAC address in the second packet with the first next-hop MAC address to form a twelfth Ethernet packet; and triggers the sending unit to send the twelfth Ethernet packet to a device that has the first next-hop MAC address; and correspondingly, that the sending unit is further configured to send the fourth packet to the device that has the first next-hop address includes: the sending unit is further configured to send the twelfth Ethernet packet to the device that has the first next-hop MAC address.

According to a fifth aspect, an embodiment of the application provides a packet processing system. The system includes a controller, a service distribution node, and a first service node instance. The controller is configured to send first service routing information to the service distribution node, where the first service routing information includes a flow identifier, a service identifier, and a next-hop address. The flow identifier is used to identify a packet flow, the service identifier is used to identify a sequence of a service node instance that processes the packet flow, and the next-hop address is used to identify the service node instance that processes the packet flow. The service distribution node is configured to receive the first service routing information sent by the controller. The service distribution node is further configured to: receive a first packet, acquire a first flow identifier according to the first packet, search the first service routing information according to the first flow identifier to acquire a matched service identifier and a matched next-hop address, and send a second packet to a first service node instance that has the matched next-hop address, where the second packet is formed by adding the matched service identifier to the first packet. The first service node instance is configured to receive the second packet.

With reference to the fifth aspect, in a first possible implementation manner, the controller is further configured to send second service routing information to the first service node instance; and the service distribution node is further configured to: receive the second service routing information, process the second packet to form a third packet, where the third packet carries a service identifier that matches the first packet, search the second service routing information according to the service identifier that matches the first packet to acquire a first next-hop address, where the first next-hop address is a next-hop address that matches the service identifier matching the first packet, and if the first next-hop address is a reachable address, send the third packet to a device that has the first next-hop address.

In the packet processing system provided in the embodiments of the application, a controller separately sends service routing information to a service distribution node and a service node instance, where the service routing information includes a flow identifier, a service identifier, and a next-hop address, the flow identifier is used to identify a packet flow, and the service identifier is used to identify a sequence of a service node instance that processes the packet flow. In this case, the service distribution node and the service node instance separately process a packet according to the received service routing information, which implements unified management performed by the controller on the service distribution node and the service node instance. Further, the service distribution node adds a service identifier to a received packet according to the service routing information, so that after processing the packet to which the service identifier is added, the service node instance may search the service routing information according to the service identifier and forward the processed packet to a next service node instance or perform normal forwarding according to a routing table, which implements service processing on the packet flow.

BRIEF DESCRIPTION OF THE DRAWINGS

To describe the technical solutions in the embodiments of the application more clearly, the following briefly introduces the accompanying drawings required for describing the embodiments. Apparently, the accompanying drawings in the following description show merely some embodiments of the application, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the application with reference to the accompanying drawings in the embodiments of the application. Apparently, the described embodiments are merely some but not all of the embodiments of the application. All other embodiments obtained by a person of ordinary skill in the art based on the embodiments of the application without creative efforts shall fall within the protection scope of the application.

Embodiment 1

Figure 1:
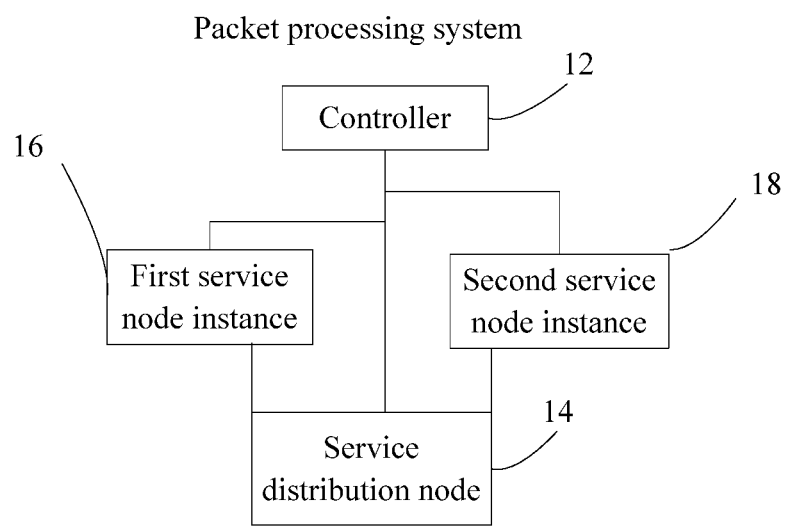
FIG. 1 is a diagram of a packet processing system according to an embodiment of the application.

This embodiment of the application provides a packet processing system. FIG. 1 is a schematic diagram of the packet processing system according to this embodiment of the application. The system includes a controller 12, a service distribution node 14, and a service node instance, for example, a first service node instance 16 and a second service node instance 18 that are shown in FIG. 1.

The controller 12 is configured to send service routing information. Specifically, the controller 12 is configured to separately deliver the service routing information to the service distribution node 14 and the service node instance.

For example, the controller 12 may allocate a service processing policy based on a packet flow, and the controller 12 separately delivers the service routing information to the service distribution node 14 and the service node instance according to a service processing policy corresponding to the packet flow. For ease of description, the controller 12 delivers first service routing information to the service distribution node 14, where the first service routing information includes a flow identifier, a service identifier (ID), and a next-hop address, the flow identifier is used to identify a packet flow, the service identifier is used to identify a sequence of a service node instance that processes the packet flow, and the next-hop address is used to identify the service node instance that processes the packet flow. It should be noted that the next-hop address may be a next-hop IP address, or may be a next-hop MAC address. Optionally, the controller 12 may deliver the service routing information to the service distribution node 14 and the service node instance 1n a service routing table manner.

The controller 12 delivers second service routing information to the service node instance, where the second service routing information includes a service ID and a next-hop address. Packet flows with a same service ID are processed by a same service node instance, and have a same sequence of processing by the service node instance. For example, a packet whose service ID=1 is first processed by the first service node instance 16, and then processed by the second service node instance 18; however, a packet whose service ID=2 is first processed by the second service node instance 18, and then processed by the first service node instance 16. Optionally, if two different service IDs are allocated to two different packets in a same packet flow, it means that although service processing that needs to be performed on the two different packets is the same, for example, first processing by using a firewall and then processing by using a NAT device, the two packets are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The service distribution node 14 is configured to receive the first service routing information and a first packet, where service processing needs to be performed on the first packet. The first packet may be sent from a user-side device, or may be sent from a network-side device, which is not limited in this embodiment of the application. The service distribution node 14 acquires a first flow identifier according to the first packet, searches the first service routing information according to the first flow identifier to acquire a matched service identifier and a matched next-hop address, and sends a second packet to the first service node instance 16 that has the matched next-hop address, where the second packet is formed by adding the matched service identifier to the first packet.

The service distribution node 14 acquires the first flow identifier according to the first packet. For example, a packet flow may be identified by using at least one of information of: a source address, a destination address, a source port, a destination port, and a protocol number. Therefore the flow identifier may include at least one of: a source address, a destination address, a source port, a destination port, and a protocol number that are of the first packet. For example, a packet flow is identified by using 5-tuple information (a source address, a destination address, a source port, a destination port, and a protocol number) of the first packet. Optionally, the first flow identifier may be the 5-tuple information of the first packet, or may be a value obtained through calculation by using an algorithm according to the 5-tuple information of the first packet, for example, a value obtained through calculation by using a hash (hash) algorithm. When the service distribution node 14 receives the first packet, if the flow identifier in the first service routing information is 5-tuple information, the service distribution node 14 acquires the 5-tuple information from the first packet, so as to obtain the first flow identifier. If the flow identifier in the first service routing information is a value obtained through calculation by using a specific algorithm based on the 5-tuple information, the service distribution node 14 acquires the 5-tuple information of the first packet from the first packet, and performs calculation by using the specific algorithm on the 5-tuple information of the first packet to obtain the value, where the obtained value is the first flow identifier.

The second packet is formed by adding the matched service identifier to the first packet. For example, the second packet may be formed by adding the matched service identifier to a header of the first packet, or may be formed by adding the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
|---|---|---|---|---|---|

The first service node instance 16 is configured to receive the second service routing information sent by the controller 12 and receive the second packet sent by the service distribution node 14; the first service node instance 16 processes the second packet to form a third packet, where the third packet carries a service identifier that matches the first packet, searches the second service routing information according to the service identifier that matches the first packet to acquire a first next-hop address, where the first next-hop address is a next-hop address that matches the service identifier matching the first packet, and if the first next-hop address is a reachable address, sends the third packet to a device that has the first next-hop address. Preferably, for the service identifier that matches the first packet, a manner of carrying the service identifier that matches the first packet by the third packet is the same as a manner of carrying the service identifier that matches the first packet by the second packet.

Optionally, the first service node instance 16 may be a logical functional entity. It should be noted that a service node instance generally has a reachable address, for example, a reachable IP address or MAC address. In this way, whether a first service node instance is a physical entity or a logical entity is not limited in this embodiment of the application, provided that the first service node instance has a reachable address. In addition, a service node instance providing a firewall function is used as an example for illustration to help understand the service node instance. Generally, a firewall function may be installed on many servers, for example, on virtual machines (VM). In this way, servers on which a firewall function is installed can all provide service processing as a firewall function, and the servers on which a firewall function is installed have different addresses. In this way, each server on which a firewall function is installed may be referred to as a service node instance, that is, each service node instance includes a reachable address and can independently process a service. In specific implementation of this embodiment of the application, the controller 12 selects the first service node instance 16 to process the packet flow. For example, the controller 12 may select, according to processing capabilities and service load statuses of service node instances, an appropriate service node instance to process the packet flow.

Optionally, when the first packet is a first IP packet, the first next-hop address is a first next-hop IP address, that the first service node instance 16 sends the third packet to a device that has the first next-hop IP address includes: the first service node instance 16 searches an ARP table according to the first next-hop IP address to acquire a first MAC address, where the first MAC address is a MAC address that matches the first next-hop IP address; the first service node instance uses the first MAC address as a destination MAC address to perform Ethernet encapsulation on the third packet to form a first Ethernet packet; and the first service node instance sends the first Ethernet packet to a device that has the first MAC address.

Optionally, the first packet is a first Ethernet packet, the first next-hop address is a first next-hop IP address, and that the first service node instance sends the third packet to a device that has the first next-hop IP address includes: the first service node instance searches an ARP table according to the first next-hop IP address to acquire a first MAC address, where the first MAC address is a MAC address that matches the first next-hop IP address; the first service node instance replaces a destination MAC address in the third packet with the first MAC address to form a second Ethernet packet; and the first service node instance sends the second Ethernet packet to a device that has the first MAC address.

Optionally, the first packet is a first IP packet, the first next-hop address is a first next-hop MAC address, and that the first service node instance sends the third packet to a device that has the first next-hop MAC address includes: the first service node instance uses the first next-hop MAC address as a destination MAC address to perform Ethernet encapsulation on the third packet to form a third Ethernet packet; and the first service node instance sends the third Ethernet packet to a device that has the first next-hop MAC address.

Optionally, the first packet is a first Ethernet packet, the first next-hop address is a first next-hop MAC address, and that the first service node instance sends the third packet to a device that has the first next-hop MAC address includes: the first service node instance replaces a destination MAC address in the third packet with the first next-hop MAC address to form a fourth Ethernet packet; and the first service node instance sends the fourth Ethernet packet to a device that has the first next-hop MAC address.

Optionally, if the first next-hop address is an unreachable IP address, the first service node instance searches a routing table according to a destination IP address in the third packet to acquire a second next-hop IP address, where the second next-hop IP address is a next-hop IP address that is in the routing table and matches the destination IP address; and the first service node instance sends a fourth packet to the device that has the second next-hop IP address, where the fourth packet is formed by removing the service identifier that matches the first packet and is carried in the second packet.

After the first service node instance 16 processes the second packet to form the third packet, if other service processing does not need to be performed on the third packet, optionally, in the second service routing information delivered by the controller 12, the next-hop address is set to a special next-hop address. For example, the next-hop address may be 0.0.0.0, where 0.0.0.0 is used to indicate that the first service node instance 16 is the last service node instance that processes the second packet. The special next-hop address may be any unreachable IP address, and is not specifically limited in this embodiment of the application, provided that it can indicate that the first service node instance 16 is the last service node instance that processes the second packet.

Optionally, the first packet is a first IP packet, and that the first service node instance sends a fourth packet to the device that has the second next-hop IP address includes: the first service node instance searches an ARP table according to the second next-hop IP address to acquire a first MAC address, where the first MAC address is a MAC address that matches the second next-hop IP address; the first service node instance uses the first MAC address as a destination MAC address to perform Ethernet encapsulation on the fourth packet to form a fifth Ethernet packet; and the first service node instance sends the fifth Ethernet packet to a device that has the first MAC address.

Optionally, the first packet is a first Ethernet packet, and that the first service node instance sends a fourth packet to the device that has the second next-hop IP address includes: the first service node instance searches an ARP table according to the second next-hop IP address to acquire a first MAC address, where the first MAC address is a MAC address that matches the second next-hop IP address; the first service node instance replaces a destination MAC address in the fourth packet with the first MAC address to form a sixth Ethernet packet; and the first service node instance sends the sixth Ethernet packet to a device that has the first MAC address.

Optionally, the first packet is an IP packet, the first next-hop address is a first next-hop MAC address, and if the first next-hop MAC address is an unreachable MAC address, the first service node instance searches a routing table according to a destination IP address in the third packet to acquire a second next-hop IP address, where the second next-hop IP address is a next-hop IP address that matches the destination IP address; the first service node instance searches an ARP table to acquire a first MAC address, where the first MAC address is a MAC address that matches the second next-hop IP address; the first service node instance uses the first MAC address as a destination MAC address to perform Ethernet encapsulation on the third packet to form a seventh Ethernet packet, where the seventh Ethernet packet does not carry the service identifier that matches the first packet; and the first service node instance sends the seventh Ethernet packet to a device that has the first MAC address.

Optionally, the first packet is an Ethernet packet, the first next-hop address is a first next-hop MAC address, and if the first next-hop MAC address is an unreachable MAC address, the first service node instance searches a routing table according to a destination IP address in the third packet to acquire a second next-hop IP address, where the second next-hop IP address is a next-hop IP address that matches the destination IP address; the first service node instance searches an ARP table to acquire a first MAC address, where the first MAC address is a MAC address that matches the second next-hop IP address; and the first service node instance replaces a destination MAC address in the third packet with the first MAC address to form an eighth Ethernet packet, where the eighth Ethernet packet does not carry the service identifier that matches the first packet; and the first service node instance sends the eighth Ethernet packet to a device that has the first MAC address.

Optionally, the second service routing information further includes control flag information, where the control flag information is used to indicate whether the packet flow has reached the last service node instance and whether normal routing and forwarding need to be performed; when searching the second service routing information, the first service node instance acquires matched control flag information; and if the matched control flag information indicates that the second packet has reached the last service node instance and normal routing and forwarding need to be performed, the first service node instance sends a fifth packet to a device that has the first next-hop address, where the fifth packet is formed by removing the service identifier that matches the first packet and is carried in the third packet.

For example, in the second service routing information delivered by the controller 12, a control flag bit may be set to indicate that the second packet has reached the last service node instance and normal routing and forwarding need to be performed. In this way, the first service node instance 16 searches the second service routing information according to the service identifier that matches the first packet to acquire the matched control flag information. The control flag information may be represented by a control flag bit; for example, when the control flag bit is 0, it indicates that the second packet needs to be processed by a next service node instance, or when the control flag bit is 1, it indicates that the second packet has reached the last service node instance and normal routing and forwarding need to be performed. A manner in which the control flag information is identified is not specifically limited in this embodiment of the application, provided that it can indicate that the second packet has reached the last service node instance and normal routing and forwarding need to be performed.

Optionally, the first packet is a first IP packet, the first next-hop address is a first next-hop IP address, and that the first service node instance sends a fifth packet to a device that has the first next-hop address includes: the first service node instance searches an ARP table according to the first next-hop IP address to acquire a second MAC address, where the second MAC address is a MAC address that matches the first next-hop IP address; the first service node instance uses the second MAC address as a destination MAC address to perform Ethernet encapsulation on the fifth packet to form a ninth Ethernet packet; and the first service node instance sends the ninth Ethernet packet to a device that has the second MAC address.

Optionally, the first packet is a first Ethernet packet, the first next-hop address is a first next-hop IP address, and that the first service node instance sends a fifth packet to a device that has the first next-hop address includes: the first service node instance searches an ARP table according to the first next-hop IP address to acquire a second MAC address, where the second MAC address is a MAC address that matches the first next-hop IP address; the first service node instance replaces a destination MAC address in the fifth packet with the second MAC address to form a tenth Ethernet packet; and the first service node instance sends the tenth Ethernet packet to a device that has the second MAC address.

Optionally, the first packet is an IP packet, the first next-hop address is a first next-hop MAC address, and that the first service node instance sends a fifth packet to a device that has the first next-hop address includes: the first service node instance uses the first next-hop MAC address as a destination address to perform Ethernet encapsulation on the fifth packet to form an eleventh Ethernet packet; and the first service node instance sends the eleventh Ethernet packet to a device that has the first next-hop MAC address.

Optionally, the first packet is an Ethernet packet, the first next-hop address is a first next-hop MAC address, and that the first service node instance sends a fifth packet to a device that has the first next-hop address includes: the first service node instance replaces a destination MAC address in the fifth packet with the first next-hop MAC address to form a twelfth Ethernet packet; and the first service node instance sends the twelfth Ethernet packet to a device that has the first next-hop MAC address.

Figure 2:
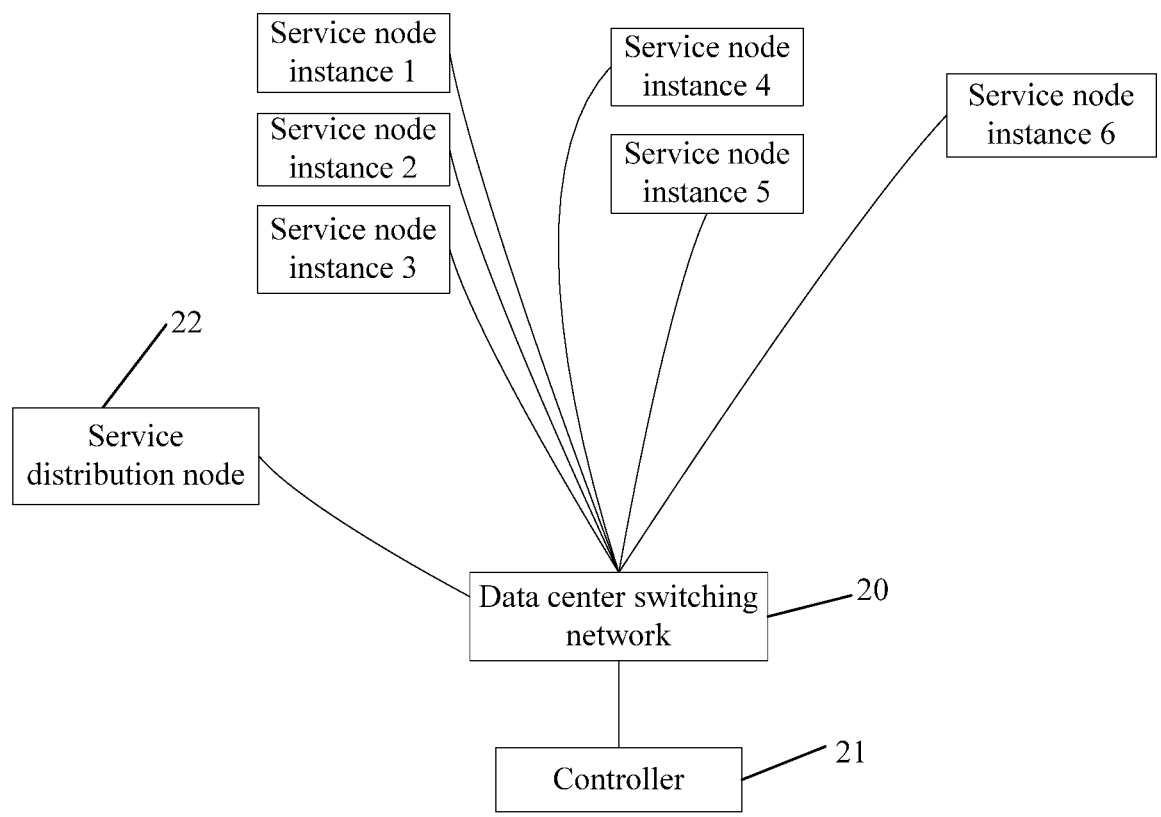
FIG. 2 is a schematic diagram of a system on a data center network according to an embodiment of the application.

To facilitate understanding, an example is used for illustration. As shown in FIG. 2. FIG. 2 is a schematic diagram of a system on a data center switching network to which this embodiment of the application is applied. A data center switching network 20 performs layer 2 routing on a controller 21, a service distribution node 22, and service node instances that are connected to the data center switching network 20. A service node instance 1, a service node instance 2, and a service node instance 3 each provide firewall processing. Both a service node instance 4 and a service node instance 5 provide NAT processing. For example, firewall processing and NAT processing need to be performed on a packet flow of a user, the controller 21 allocates a service processing policy in advance to a packet flow sent by the user, and the controller 21 selects the service node instance 1 to provide firewall processing and selects the service node instance 5 to provide NAT processing to generate a service ID. It should be noted that a representation manner of the service ID is not limited. 1 is used as an example, where 1 indicates that firewall processing and NAT processing need to be performed on the packet flow and indicates that firewall processing is first performed by the service node instance 1 and then NAT processing is performed by the service node instance 5. The controller 21 separately generates a service routing table for the service distribution node 22, the service node instance 1, and the service node instance 5. For ease of description, the service routing table generated by the controller 21 for the service distribution node 22 is referred to as a first service routing table, the service routing table generated by the controller 21 for the service node instance 1 is referred to as a second service routing table, and the service routing table generated by the controller 21 for the service node instance 5 is referred to as a third service routing table. The first service routing table includes a flow identifier, a service identifier 1, and a first next-hop address, where the flow identifier is 5-tuple information of the packet flow; for example, the first next-hop address is an IP address of the service node instance 1, for example, 1.1.1.2. The second service routing table includes a service identifier 1 and a second next-hop address; for example, the second next-hop address is an IP address of the service node instance 5, for example, 1.1.1.1. The third service routing table includes a service identifier 1 and a third next-hop address; for example, the third next-hop address is a special next-hop IP address 0.0.0.0, which is used to indicate that the service node instance 5 is the last service node instance that processes the packet flow. In this way, a format of the first service routing table may be as follows:

| Flow identifier | Service identifier | Next-hop IP address |
| --- | --- | --- |
| 5-tuple information | 1 | 1.1.1.2 |

A format of the second service routing table may be as follows:

| Service identifier | Next-hop IP address |
| --- | --- |
| 1 | 1.1.1.1 |

A format of the third service routing table may be as follows:

| Service identifier | Next-hop IP address |
| --- | --- |
| 1 | 0.0.0.0 |

In this way, the service distribution node 22 receives a first packet sent by the user, and the service distribution node 22 acquires 5-tuple information of the packet, and searches the first service routing table according to the 5-tuple information to obtain a matched service identifier and a next-hop IP address. In this embodiment, the matched service identifier is 1, the next-hop IP address is 1.1.1.2, and the service distribution node 22 sends a second packet to the service node instance 1 that has the next-hop IP address 1.1.1.2, where the second packet is formed by adding the matched service identifier to the first packet. The service node instance 1 performs firewall processing on the second packet to form a third packet, where the third packet carries the service identifier that matches the first packet. The service node instance 1 searches the second service routing table according to the service identifier to acquire the matched next-hop IP address 1.1.1.1, and the service node instance 1 sends the third packet to the service node instance 5 that has the IP address 1.1.1.1. The service node instance 5 performs NAT processing on the third packet; the service node instance 5 searches the third service routing table according to the service identifier to determine the matched next-hop IP address 0.0.0.0, where the matched next-hop IP address 0.0.0.0 indicates that the service node instance 5 is the last service node instance that processes the third packet; then, the service node instance 5 performs NAT processing on the third packet to form a fourth packet, and searches the routing table according to a destination IP address of the fourth packet to acquire a first next-hop IP address, where the first next-hop IP address is a next-hop IP address that matches the destination IP address; the service node instance 5 sends the fourth packet to a device that has the first next-hop IP address.

In the packet processing system provided in this embodiment of the application, a controller separately sends service routing information to a service distribution node and a service node instance, where the service routing information includes a flow identifier, a service identifier, and a next-hop address, the flow identifier is used to identify a packet flow, and the service identifier is used to identify a sequence of a service node instance that processes the packet flow. In this case, the service distribution node and the service node instance separately process a packet according to the received service routing information, which implements unified management performed by the controller on the service distribution node and the service node instance. Further, the service distribution node adds a service identifier to a received packet according to the service routing information, and sends the packet to which the service identifier is added to the service node instance, so that after processing the packet to which the service identifier is added, the service node instance may search the service routing information according to the service identifier and forward the processed packet flow to a next service node instance or perform normal forwarding according to a routing table, which implements service processing on the packet flow.

Embodiment 2

Figure 3:
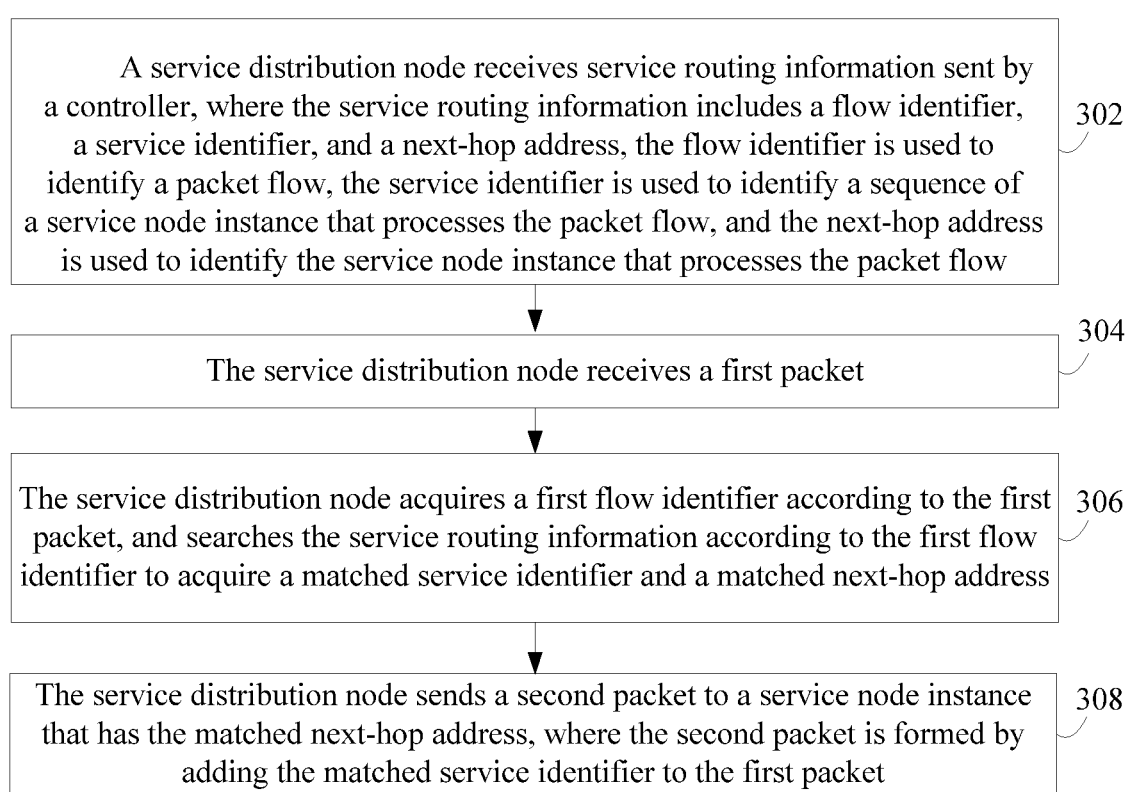
FIG. 3 is a flowchart of a packet processing method according to an embodiment of the application.

This embodiment of the application provides a packet processing method. As shown in FIG. 3, FIG. 3 is a flowchart of the packet processing method according to this embodiment of the application.

302. A service distribution node receives service routing information sent by a controller, where the service routing information includes a flow identifier, a service identifier, and a next-hop address, the flow identifier is used to identify a packet flow, the service identifier is used to identify a sequence of a service node instance that processes the packet flow, and the next-hop address is used to identify the service node instance that processes the packet flow.

Optionally, the controller may allocate a service processing policy based on a packet flow. The controller delivers the service routing information to the service distribution node according to a service processing policy corresponding to the packet flow. Packet flows with a same service identifier ID are processed by a same service node instance, and have a same sequence of processing by the service node instance. Further, in specific implementation of this embodiment of the application, if two different service IDs are allocated to two different packets in a same packet flow, it means that although service processing that needs to be performed on the two different packets is the same, the packet flow is processed by different service node instances. In this way, load balancing may be implemented for packet processing. For example, the two different packets are first processed by a firewall, and then processed by a NAT device, but are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

304. The service distribution node receives a first packet.

For example, generally, the first packet may be an IP packet or an Ethernet packet, and the first packet may be sent from a user-side device, or may be sent from a network-side device, which is not limited in this embodiment of the application.

306. The service distribution node acquires a first flow identifier according to the first packet, and searches the service routing information according to the first flow identifier to acquire a matched service identifier and a matched next-hop IP address.

For example, a packet flow may be identified by using at least one of information of: a source address, a destination address, a source port, a destination port, and a protocol number. Therefore the flow identifier may include at least one of: a source address, a destination address, a source port, a destination port, and a protocol number that are of the first packet. For example, a packet flow is identified by using 5-tuple information (a source address, a destination address, a source port, a destination port, and a protocol number) of the first packet. Optionally, the first flow identifier may be the 5-tuple information of the first packet, or may be a value obtained through calculation by using an algorithm according to the 5-tuple information of the first packet, for example, a value obtained through calculation by using a hash algorithm. When the service distribution node receives the first packet, if the flow identifier in the service routing information is 5-tuple information, the service distribution node acquires the 5-tuple information from the first packet, so as to obtain the first flow identifier. If the flow identifier in the first service routing information is a value obtained through calculation by using a specific algorithm based on the 5-tuple information, the service distribution node acquires the 5-tuple information of the first packet from the first packet, and performs calculation by using the specific algorithm on the 5-tuple information of the first packet to obtain the value, where the obtained value is the first flow identifier.

308. The service distribution node sends a second packet to a service node instance that has the matched next-hop address, where the second packet is formed by adding the matched service identifier to the first packet.

The second packet is formed by adding the matched service identifier to the first packet. For example, the second packet may be formed by adding the matched service identifier to a header of the first packet, or may be formed by adding the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
| --- | --- | --- | --- | --- | --- |

According to the packet processing method provided in this embodiment of the application, a service distribution node receives service routing information sent by a controller, where the service routing information includes a flow identifier, a service identifier, and a next-hop address, the flow identifier is used to identify a packet flow, and the service identifier is used to identify a sequence of a service node instance that processes the packet flow. In this case, the service distribution node adds a service identifier to a received packet according to the service routing information, and sends the packet that carries the service identifier to a service node instance, so that after processing the packet to which the service identifier is added, the service node instance may search the service routing information according to the service identifier and forward the processed packet flow to a next service node instance or perform normal forwarding according to a routing table, which implements service processing on the packet flow.

Embodiment 3

Figure 4:
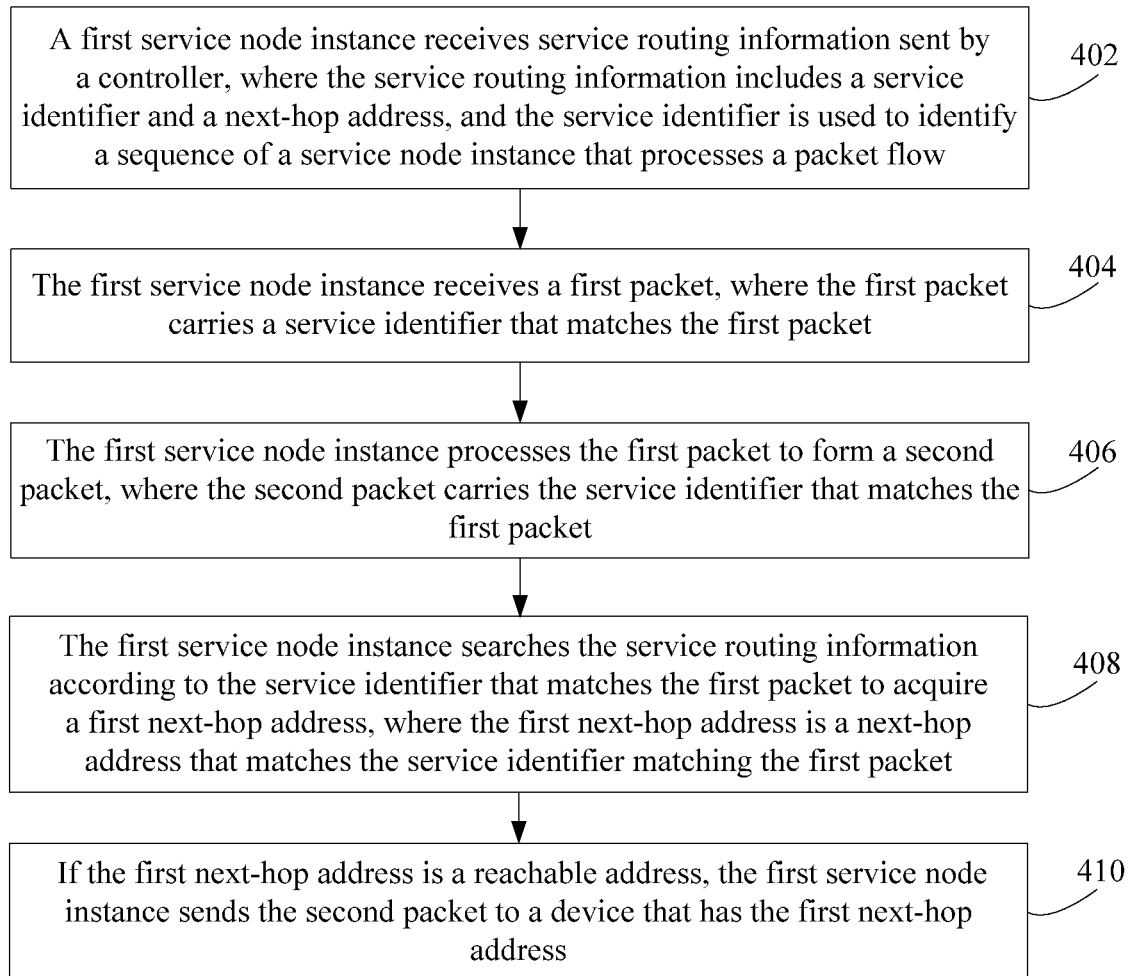
FIG. 4 is a flowchart of another packet processing method according to an embodiment of the application.

This embodiment of the application provides another packet processing method. FIG. 4 is a flowchart of the another packet processing method according to this embodiment of the application.

402. A first service node instance receives service routing information sent by a controller, where the service routing information includes a service identifier and a next-hop address, and the service identifier is used to identify a sequence of a service node instance that processes a packet flow.

In specific implementation of this embodiment of the application, the controller may allocate a service processing policy based on a packet flow. The controller delivers the service routing information to service node instances according to a service processing policy corresponding to the packet flow. Packet flows with a same service ID are processed by a same service node instance, and have a same sequence of processing by the service node instance. For example, a packet whose service ID=1 is first processed by a first service node instance 16, and then processed by a second service node instance 18; however, a packet whose service ID=2 is first processed by the second service node instance 18, and then processed by the first service node instance 16. Optionally, if two different service IDs are allocated to two different packets in a same packet flow, it means that although service processing that needs to be performed on the two different packets is the same, for example, first processing by using a firewall and then processing by using a NAT device, the two packets are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The first service node instance may be a logical functional entity. It should be noted that a service node instance generally has a reachable address, for example, a reachable IP address or MAC address. In this way, whether a first service node instance is a physical entity or a logical entity is not limited in this embodiment of the application, provided that the first service node instance has a reachable address. In addition, a service node instance providing a firewall function is used as an example for illustration to help understand the service node instance. Generally, a firewall function may be installed on many servers, for example, on virtual machines. In this way, servers on which a firewall function is installed can all provide service processing as a firewall function, and the servers on which a firewall function is installed have different addresses. In this way, each server on which a firewall function is installed may be referred to as a service node instance, that is, each service node instance includes a reachable address and can independently process a service. In specific implementation of this embodiment of the application, the controller determines to select the first service node instance to process the packet flow. For example, the controller may select, according to processing capabilities and service load statuses of service node instances, an appropriate service node instance to process the packet flow.

404. The first service node instance receives a first packet, where the first packet carries a service identifier that matches the first packet.

For example, the first service node instance may receive a first packet sent by a service distribution node or receive a first packet sent by another service node instance.

For example, the service distribution node may add the service identifier that matches the first packet to a header of the first packet, or add the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
| --- | --- | --- | --- | --- | --- |

406. The first service node instance processes the first packet to form a second packet, where the second packet carries the service identifier that matches the first packet.

Preferably, a manner of carrying the service identifier that matches the first packet by the second packet is the same as a manner of carrying the service identifier that matches the first packet by the first packet. How the first service node instance processes the first packet belongs to the prior art; for example, the first service node instance performs NAT processing or firewall processing on the first packet, and details are not described in the application again.

408. The first service node instance searches the service routing information according to the service identifier that matches the first packet to acquire a first next-hop address, where the first next-hop address is a next-hop address that matches the service identifier matching the first packet.

410. If the first next-hop address is a reachable address, the first service node instance sends the second packet to a device that has the first next-hop address.

Optionally, when the first packet is a first IP packet, the first next-hop address is a first next-hop IP address, that the first service node instance sends the second packet to a device that has the first next-hop IP address includes: the first service node instance searches an ARP table according to the first next-hop IP address to acquire a first MAC address, where the first MAC address is a MAC address that matches the first next-hop IP address; the first service node instance uses the first MAC address as a destination MAC address to perform Ethernet encapsulation on the second packet to form a first Ethernet packet; and the first service node instance sends the first Ethernet packet to a device that has the first MAC address.

Optionally, the first packet is a first Ethernet packet, the first next-hop address is a first next-hop IP address, and that the first service node instance sends the second packet to a device that has the first next-hop IP address includes: the first service node instance searches an ARP table according to the first next-hop IP address to acquire a first MAC address, where the first MAC address is a MAC address that matches the first next-hop IP address; the first service node instance replaces a destination MAC address in the second packet with the first MAC address to form a second Ethernet packet; and the first service node instance sends the second Ethernet packet to a device that has the first MAC address.

Optionally, the first packet is a first IP packet, the first next-hop address is a first next-hop MAC address, and that the first service node instance sends the second packet to a device that has the first next-hop MAC address includes: the first service node instance uses the first next-hop MAC address as a destination MAC address to perform Ethernet encapsulation on the second packet to form a third Ethernet packet; and the first service node instance sends the third Ethernet packet to a device that has the first next-hop MAC address.

Optionally, the first packet is a first Ethernet packet, the first next-hop address is a first next-hop MAC address, and that the first service node instance sends the second packet to a device that has the first next-hop MAC address includes: the first service node instance replaces a destination MAC address in the second packet with the first next-hop MAC address to form a fourth Ethernet packet; and the first service node instance sends the fourth Ethernet packet to a device that has the first next-hop MAC address.

Optionally, if the first next-hop address is an unreachable IP address, the first service node instance searches a routing table according to a destination IP address in the second packet to acquire a second next-hop IP address, where the second next-hop IP address is a next-hop IP address that is in the routing table and matches the destination IP address; and the first service node instance sends a third packet to a device that has the second next-hop IP address, where the third packet is formed by removing the service identifier that matches the first packet and is carried in the second packet.

After the first service node instance processes the first packet to form the second packet, if other service processing does not need to be performed on the second packet, optionally, in the service routing information delivered by the controller, the next-hop address is set to a special next-hop address. For example, the next-hop address may be 0.0.0.0, where 0.0.0.0 is used to indicate that the first service node instance is the last service node instance that processes the first packet. The special next-hop address may be any unreachable IP address, and is not specifically limited in this embodiment of the application, provided that it can indicate that the first service node instance is the last service node instance that processes the first packet.

Optionally, the first packet is a first IP packet, and that the first service node instance sends a third packet to a device that has the second next-hop IP address includes: the first service node instance searches an ARP table according to the second next-hop IP address to acquire a first MAC address, where the first MAC address is a MAC address that matches the second next-hop IP address; the first service node instance uses the first MAC address as a destination MAC address to perform Ethernet encapsulation on the third packet to form a fifth Ethernet packet; and the first service node instance sends the fifth Ethernet packet to a device that has the first MAC address.

Optionally, the first packet is a first Ethernet packet, and that the first service node instance sends a third packet to a device that has the second next-hop IP address includes: the first service node instance searches an ARP table according to the second next-hop IP address to acquire a first MAC address, where the first MAC address is a MAC address that matches the second next-hop IP address; the first service node instance replaces a destination MAC address in the third packet with the first MAC address to form a sixth Ethernet packet; and the first service node instance sends the sixth Ethernet packet to a device that has the first MAC address.

Optionally, the first packet is an IP packet, the first next-hop address is a first next-hop MAC address, and if the first next-hop MAC address is an unreachable MAC address, the first service node instance searches a routing table according to a destination IP address in the second packet to acquire a second next-hop IP address, where the second next-hop IP address is a next-hop IP address that matches the destination IP address; the first service node instance searches an ARP table to acquire a first MAC address, where the first MAC address is a MAC address that matches the second next-hop IP address; the first service node instance uses the first MAC address as a destination MAC address to perform Ethernet encapsulation on the second packet to form a seventh Ethernet packet, where the seventh Ethernet packet does not carry the service identifier that matches the first packet; and the first service node instance sends the seventh Ethernet packet to a device that has the first MAC address.

Optionally, the first packet is an Ethernet packet, the first next-hop address is a first next-hop MAC address, and if the first next-hop MAC address is an unreachable MAC address, the first service node instance searches a routing table according to a destination IP address in the second packet to acquire a second next-hop IP address, where the second next-hop IP address is a next-hop IP address that matches the destination IP address; the first service node instance searches an ARP table to acquire a first MAC address, where the first MAC address is a MAC address that matches the second next-hop IP address; and the first service node instance replaces a MAC address in the second packet with the first MAC address to form an eighth Ethernet packet, where the eighth Ethernet packet does not carry the service identifier that matches the first packet; and the first service node instance sends the eighth Ethernet packet to a device that has the first MAC address.

Optionally, the service routing information further includes control flag information, where the control flag information is used to indicate whether the packet flow has reached the last service node instance and whether normal routing and forwarding need to be performed; when searching the service routing information, the first service node instance acquires matched control flag information; and if the matched control flag information indicates that the first packet has reached the last service node instance and normal routing and forwarding need to be performed, the first service node instance sends a fourth packet to the device that has the first next-hop address, where the fourth packet is formed by removing the service identifier that matches the first packet and is carried in the second packet.

For example, in service routing information delivered by the controller, a control flag bit may be set to indicate that the first packet has reached the last service node instance and normal routing and forwarding need to be performed. In this way, the first service node instance 16 searches the service routing information according to the service identifier that matches the first packet to acquire the matched control flag information. The control flag information may be represented by a control flag bit; for example, when the control flag bit is 0, it indicates that the first packet needs to be processed by a next service node instance, or when the control flag bit is 1, it indicates that the first packet has reached the last service node instance and normal routing and forwarding need to be performed. A manner in which the control flag information is identified is not specifically limited in this embodiment of the application, provided that it can indicate that the first packet has reached the last service node instance and normal routing and forwarding need to be performed.

Optionally, the first packet is a first IP packet, the first next-hop address is a first next-hop IP address, and that the first service node instance sends a fourth packet to the device that has the first next-hop address includes: the first service node instance searches an ARP table according to the first next-hop IP address to acquire a second MAC address, where the second MAC address is a MAC address that matches the first next-hop IP address; the first service node instance uses the second MAC address as a destination MAC address to perform Ethernet encapsulation on the fourth packet to form a ninth Ethernet packet; and the first service node instance sends the ninth Ethernet packet to a device that has the second MAC address.

Optionally, the first packet is a first Ethernet packet, the first next-hop address is a first next-hop IP address, and that the first service node instance sends a fourth packet to the device that has the first next-hop address includes: the first service node instance searches an ARP table according to the first next-hop IP address to acquire a second MAC address, where the second MAC address is a MAC address that matches the first next-hop IP address; the first service node instance replaces a destination MAC address in the fourth packet with the second MAC address to form a tenth Ethernet packet; and the first service node instance sends the tenth Ethernet packet to a device that has the second MAC address.

Optionally, the first packet is an IP packet, the first next-hop address is a first next-hop MAC address, and that the first service node instance sends a fourth packet to the device that has the first next-hop address includes: the first service node instance uses the first next-hop MAC address as a destination address to perform Ethernet encapsulation on the fourth packet to form an eleventh Ethernet packet; and the first service node instance sends the eleventh Ethernet packet to a device that has the first next-hop MAC address.

Optionally, the first packet is an Ethernet packet, the first next-hop address is a first next-hop MAC address, and that the first service node instance sends a fourth packet to the device that has the first next-hop address includes: the first service node instance replaces a destination MAC address in the second packet with the first next-hop MAC address to form a twelfth Ethernet packet; and the first service node instance sends the twelfth Ethernet packet to a device that has the first next-hop MAC address.

According to the packet processing method provided in this embodiment of the application, a service node instance receives a packet that carries a service identifier, processes the packet, searches service routing information according to the service identifier, and forwards the processed packet to a next service node instance or performs normal forwarding according to a routing table, which implements service processing on a packet flow.

Embodiment 4

Figure 5:
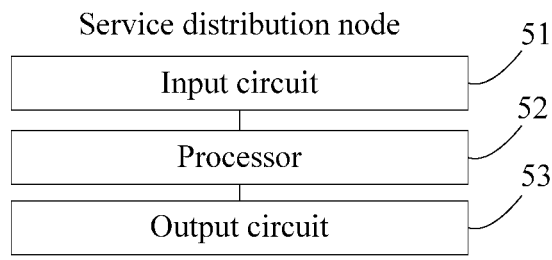
FIG. 5 is a schematic diagram of an apparatus of a service distribution node according to an embodiment of the application.

This embodiment of the application provides a service distribution node. As shown in FIG. 5, FIG. 5 is a schematic diagram of an apparatus of the service distribution node according to this embodiment of the application.

The service distribution node includes an input circuit 51, a processor 52, and an output circuit 53.

The input circuit 51 is configured to receive service routing information sent by a controller and receive a packet, where the service routing information includes a flow identifier, a service identifier, and a next-hop address, the flow identifier is used to identify a packet flow, the service identifier is used to identify a sequence of a service node instance that processes the packet flow, and the next-hop address is used to identify the service node instance that processes the packet flow.

Optionally, the controller may allocate a service processing policy based on a packet flow. The controller delivers the service routing information to the service distribution node according to a service processing policy corresponding to the packet flow. Packet flows with a same service identifier ID are processed by a same service node instance, and have a same sequence of processing by the service node instance. Further, in specific implementation of this embodiment of the application, if two different service IDs are allocated to two different packets in a same packet flow, it means that although service processing that needs to be performed on the two different packets is the same, the packet flow is processed by different service node instances. In this way, load balancing may be implemented for packet processing. For example, the two different packets are first processed by a firewall, and then processed by a NAT device, but are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The input circuit 51 is further configured to receive a first packet.

For example, generally, the first packet may be an IP packet or an Ethernet packet, and the first packet may be sent from a user-side device, or may be sent from a network-side device, which is not limited in this embodiment of the application.

The processor 52 is configured to: acquire a first flow identifier according to the first packet, and search the service routing information according to the first flow identifier to acquire a matched service identifier and a matched next-hop address; and trigger the output circuit 53 to send a second packet to a first service node instance that has the matched next-hop address, where the second packet is formed by adding the matched service identifier to the first packet.

For example, a packet flow may be identified by using at least one of information of: a source address, a destination address, a source port, a destination port, and a protocol number. Therefore the flow identifier may include at least one of: a source address, a destination address, a source port, a destination port, and a protocol number that are of the first packet. For example, a packet flow is identified by using 5-tuple information (a source address, a destination address, a source port, a destination port, and a protocol number) of the first packet. Optionally, the first flow identifier may be the 5-tuple information of the first packet, or may be a value obtained through calculation by using an algorithm according to the 5-tuple information of the first packet, for example, a value obtained through calculation by using a hash algorithm. When the service distribution node receives the first packet, if the flow identifier in the service routing information is 5-tuple information, the service distribution node acquires the 5-tuple information from the first packet, so as to obtain the first flow identifier. If the flow identifier in the first service routing information is a value obtained through calculation by using a specific algorithm based on the 5-tuple information, the service distribution node acquires the 5-tuple information of the first packet from the first packet, and performs calculation by using the specific algorithm on the 5-tuple information of the first packet to obtain the value, where the obtained value is the first flow identifier.

The output circuit 53 is configured to send the second packet to the first service node instance that has the matched next-hop address.

The second packet is formed by adding the matched service identifier to the first packet. For example, the second packet may be formed by adding the matched service identifier to a header of the first packet, or may be formed by adding the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
| --- | --- | --- | --- | --- | --- |

According to the service distribution node provided in this embodiment of the application, the service distribution node adds a service identifier to a received packet according to service routing information, so that after processing the packet to which the service identifier is added, the service node instance may search the service routing information according to the service identifier and forward a processed packet flow to a next service node instance or perform normal forwarding according to a routing table, which implements service processing on the packet flow.

Embodiment 5

Figure 6:
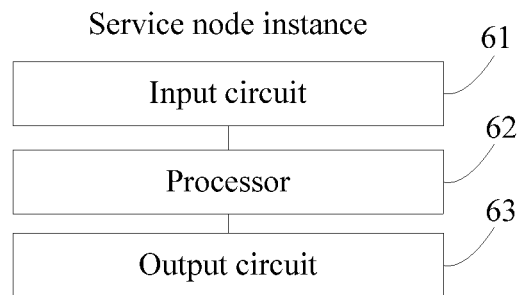
FIG. 6 is a schematic diagram of an apparatus of a service node instance according to an embodiment of the application.

This embodiment of the application provides a service node instance. As shown in FIG. 6, FIG. 6 is a schematic diagram of an apparatus of the service node instance according to this embodiment of the application.

The service node instance includes an input circuit 61, a processor 62, and an output circuit 63.

The input circuit 61 is configured to receive service routing information sent by a controller, where the service routing information includes a service identifier and a next-hop address, and the service identifier is used to identify a sequence of a service node instance that processes a packet flow.

In specific implementation of this embodiment of the application, the controller may allocate a service processing policy based on a packet flow. The controller delivers the service routing information to service node instances according to a service processing policy corresponding to the packet flow. Packet flows with a same service ID are processed by a same service node instance, and have a same sequence of processing by the service node instance. For example, a packet whose service ID=1 is first processed by a first service node instance 16, and then processed by a second service node instance 18; however, a packet whose service ID=2 is first processed by the second service node instance 18, and then processed by the first service node instance 16. Optionally, if two different service IDs are allocated to two different packets in a same packet flow, it means that although service processing that needs to be performed on the two different packets is the same, for example, first processing by using a firewall and then processing by using a NAT device, the two packets are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The first service node instance may be a logical functional entity. It should be noted that a service node instance generally has a reachable address, for example, a reachable IP address or MAC address. In this way, whether a first service node instance is a physical entity or a logical entity is not limited in this embodiment of the application, provided that the first service node instance has a reachable address. In addition, a service node instance providing a firewall function is used as an example for illustration to help understand the service node instance. Generally, a firewall function may be installed on many servers, for example, on virtual machines VMs. In this way, servers on which a firewall function is installed can all provide service processing as a firewall function, and the servers on which a firewall function is installed have different addresses. In this way, each server on which a firewall function is installed may be referred to as a service node instance, that is, each service node instance includes a reachable address and can independently process a service. In specific implementation of this embodiment of the application, the controller determines to select the first service node instance to process the packet flow. For example, the controller may select, according to processing capabilities and service load statuses of service node instances, an appropriate service node instance to process the packet flow.

The input circuit 61 is further configured to receive a sent first packet, where the first packet carries a service identifier that matches the first packet.

For example, the input circuit 61 is further configured to receive a first packet sent by a service distribution node or receive a first packet sent by another service node instance.

For example, the service distribution node may add the service identifier that matches the first packet to a header of the first packet, or add the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multi-protocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
| --- | --- | --- | --- | --- | --- |

The processor 62 is configured to: process the first packet to form a second packet, where the second packet carries the service identifier that matches the first packet; search the service routing information according to the service identifier that matches the first packet to acquire a first next-hop address, where the first next-hop address is a next-hop address that matches the service identifier matching the first packet; and if the first next-hop address is a reachable address, trigger the output circuit 63 to send the second packet to a device that has the first next-hop address.

Preferably, a manner of carrying the service identifier that matches the first packet by the second packet is the same as a manner of carrying the service identifier that matches the first packet by the first packet. How the first service node instance processes the first packet belongs to the prior art; for example, the first service node instance performs NAT processing or firewall processing on the first packet, and details are not described in the application again.

The output circuit 63 is configured to send the second packet to the device that has the first next-hop address.

Optionally, the first packet is a first IP packet, the first next-hop address is a first next-hop IP address, and that the processor 62 triggers the output circuit to send the second packet to the device that has the first next-hop address includes: the processor 62 searches an ARP table according to the first next-hop IP address to acquire a first MAC address, where the first MAC address is a MAC address that matches the first next-hop IP address; the processor 62 uses the first MAC address as a destination MAC address to perform Ethernet encapsulation on the second packet to form a first Ethernet packet; and the processor 62 triggers the output circuit to send the first Ethernet packet to a device that has the first MAC address; and correspondingly, that the output circuit is configured to send the second packet to the device that has the first next-hop address includes: the output circuit is configured to send the first Ethernet packet to the device that has the first MAC address.

Optionally, the first packet is a first Ethernet packet, the first next-hop address is a first next-hop IP address, and that the processor 62 triggers the output circuit to send the second packet to the device that has the first next-hop address includes: the processor 62 searches an ARP table according to the first next-hop IP address to acquire a first MAC address, where the first MAC address is a MAC address that matches the first next-hop IP address; the processor 62 replaces a destination MAC address in the second packet with the first MAC address to form a second Ethernet packet; and the processor 62 triggers the output circuit to send the second Ethernet packet to a device that has the first MAC address; and correspondingly, that the output circuit is configured to send the second packet to the device that has the first next-hop address includes: the output circuit is configured to send the second Ethernet packet to the device that has the first MAC address.

Optionally, the first packet is a first IP packet, the first next-hop address is a first next-hop MAC address, and that the processor 62 triggers the output circuit to send the second packet to the device that has the first next-hop address includes: the processor 62 uses the first next-hop MAC address as a destination MAC address to perform Ethernet encapsulation on the second packet to form a third Ethernet packet; and the processor 62 triggers the output circuit to send the third Ethernet packet to a device that has the first next-hop MAC address; and correspondingly, that the output circuit is configured to send the second packet to the device that has the first next-hop address includes: the output circuit is configured to send the third Ethernet packet to the device that has the first next-hop MAC address.

Optionally, the first packet is a first Ethernet packet, the first next-hop address is a first next-hop MAC address, and that the processor 62 triggers the output circuit to send the second packet to the device that has the first next-hop address includes: the processor 62 replaces a destination MAC address in the second packet with the first next-hop MAC address to form a fourth Ethernet packet; and the processor 62 triggers the output circuit to send the fourth Ethernet packet to a device that has the first next-hop MAC address; and correspondingly, that the output circuit is configured to send the second packet to the device that has the first next-hop address includes: the output circuit is configured to send the fourth Ethernet packet to the device that has the first next-hop MAC address.

Optionally, the processor 62 is further configured to: if the first next-hop address is an unreachable IP address, search a routing table according to a destination IP address in the second packet to acquire a second next-hop IP address, where the second next-hop IP address is a next-hop IP address that is in the routing table and matches the destination IP address; and trigger the output circuit to send a third packet to a device that has the second next-hop IP address, where the third packet is formed by removing the service identifier that matches the first packet and is carried in the second packet; and correspondingly, the output circuit is further configured to send the third packet to the device that has the second next-hop IP address.

After the first service node instance processes the first packet to form the second packet, if other service processing does not need to be performed on the third packet, optionally, in the service routing information delivered by the controller, the next-hop address is set to a special next-hop address. For example, the next-hop address may be 0.0.0.0, where 0.0.0.0 is used to indicate that the first service node instance is the last service node instance that processes the first packet. The special next-hop address may be any unreachable IP address, and is not specifically limited in this embodiment of the application, provided that it can indicate that the first service node instance is the last service node instance that processes the first packet.

Optionally, the first packet is a first IP packet, and that the processor 62 triggers the output circuit to send the third packet to the device that has the second next-hop IP address includes: the processor 62 searches an ARP table according to the second next-hop IP address to acquire a first MAC address, where the first MAC address is a MAC address that matches the second next-hop IP address; the processor 62 uses the first MAC address as a destination MAC address to perform Ethernet encapsulation on the third packet to form a fifth Ethernet packet; and the processor 62 triggers the output circuit to send the fifth Ethernet packet to a device that has the first MAC address; and correspondingly, that the output circuit is further configured to send the third packet to the device that has the second next-hop IP address includes: the output circuit is further configured to send the fifth Ethernet packet to the device that has the first MAC address.

Optionally, the first packet is a first Ethernet packet, and that the processor 62 triggers the output circuit to send the third packet to the device that has the second next-hop IP address includes: the processor 62 searches an ARP table according to the second next-hop IP address to acquire a first MAC address, where the first MAC address is a MAC address that matches the second next-hop IP address; the processor 62 replaces a destination MAC address in the third packet with the first MAC address to form a sixth Ethernet packet; and the processor 62 triggers the output circuit to send the sixth Ethernet packet to a device that has the first MAC address; and correspondingly, that the output circuit is further configured to send the third packet to the device that has the second next-hop IP address includes: the output circuit sends the sixth Ethernet packet to the device that has the first MAC address.

Optionally, the first packet is an IP packet, the first next-hop address is a first next-hop MAC address, and the processor 62 is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; use the first MAC address as a destination MAC address to perform Ethernet encapsulation on the second packet to form a seventh Ethernet packet, where the seventh Ethernet packet does not carry the service identifier that matches the first packet; and trigger the output circuit to send the seventh Ethernet packet to a device that has the first MAC address; and correspondingly, the output circuit is further configured to send the seventh Ethernet packet to the device that has the first MAC address.

Optionally, the first packet is an Ethernet packet, the first next-hop address is a first next-hop MAC address, and the processor 62 is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; replace a MAC address in the second packet with the first MAC address to form an eighth Ethernet packet, where the eighth Ethernet packet does not carry the service identifier that matches the first packet; and trigger the output circuit to send the eighth Ethernet packet to a device that has the first MAC address; and correspondingly, the output circuit is further configured to send the eighth Ethernet packet to the device that has the first MAC address.

Optionally, the service routing information further includes control flag information, the control flag information is used to indicate whether the packet flow has reached the last service node instance and whether normal routing and forwarding need to be performed, and the processor 62 is further configured to: when searching the service routing information, acquire matched control flag information; and if the matched control flag information indicates that the first packet has reached the last service node instance and normal routing and forwarding need to be performed, trigger the output circuit to send a fourth packet to the device that has the first next-hop address, where the fourth packet is formed by removing the service identifier that matches the first packet and is carried in the second packet.

For example, in the service routing information delivered by the controller, a control flag bit may be set to indicate that the first packet has reached the last service node instance and normal routing and forwarding need to be performed. In this way, the first service node instance 16 searches the service routing information according to the service identifier that matches the first packet to acquire the matched control flag information. The control flag information may be represented by a control flag bit; for example, when the control flag bit is 0, it indicates that the first packet needs to be processed by a next service node instance, or when the control flag bit is 1, it indicates that the first packet has reached the last service node instance and normal routing and forwarding need to be performed. A manner in which the control flag information is identified is not specifically limited in this embodiment of the application, provided that it can indicate that the first packet has reached the last service node instance and normal routing and forwarding need to be performed.

Correspondingly, the output circuit is further configured to send the fourth packet to the device that has the first next-hop address.

Optionally, the first packet is a first IP packet, the first next-hop address is a first next-hop IP address, and that the processor 62 triggers the output circuit to send the fourth packet to the device that has the first next-hop address includes: the processor 62 searches an ARP table according to the first next-hop IP address to acquire a second MAC address, where the second MAC address is a MAC address that matches the first next-hop IP address; uses the second MAC address as a destination MAC address to perform Ethernet encapsulation on the fourth packet to form a ninth Ethernet packet; and triggers the output circuit to send the ninth Ethernet packet to a device that has the second MAC address; and correspondingly, that the output circuit is further configured to send the fourth packet to the device that has the first next-hop address includes: the output circuit is further configured to send the ninth Ethernet packet to the device that has the second MAC address.

Optionally, the first packet is a first Ethernet packet, the first next-hop address is a first next-hop IP address, and that the processor 62 triggers the output circuit to send the fourth packet to the device that has the first next-hop address includes: the processor 62 searches an ARP table according to the first next-hop IP address to acquire a second MAC address, where the second MAC address is a MAC address that matches the first next-hop IP address; replaces a destination MAC address in the fourth packet with the second MAC address to form a tenth Ethernet packet; and triggers the output circuit to send the tenth Ethernet packet to a device that has the second MAC address; and correspondingly, that the output circuit is further configured to send the fourth packet to the device that has the first next-hop address includes: the output circuit is further configured to send the tenth Ethernet packet to the device that has the second MAC address.

Optionally, the first packet is an IP packet, the first next-hop address is a first next-hop MAC address, and that the processor 62 triggers the output circuit to send the fourth packet to the device that has the first next-hop address includes: the processor 62 uses the first next-hop MAC address as a destination address to perform Ethernet encapsulation on the fourth packet to form an eleventh Ethernet packet; and triggers the output circuit to send the eleventh Ethernet packet to a device that has the first next-hop MAC address; and correspondingly, that the output circuit is further configured to send the fourth packet to the device that has the first next-hop address includes: the output circuit is further configured to send the eleventh Ethernet packet to the device that has the first next-hop MAC address.

Optionally, the first packet is an Ethernet packet, the first next-hop address is a first next-hop MAC address, and that the processor 62 triggers the output circuit to send the fourth packet to the device that has the first next-hop address includes: the processor 62 replaces a destination MAC address in the second packet with the first next-hop MAC address to form a twelfth Ethernet packet; and triggers the output circuit to send the twelfth Ethernet packet to a device that has the first next-hop MAC address; and correspondingly, that the output circuit is further configured to send the fourth packet to the device that has the first next-hop address includes: the output circuit is further configured to send the twelfth Ethernet packet to the device that has the first next-hop MAC address.

The service node instance provided in this embodiment of the application receives a packet that carries a service identifier, processes the packet, searches service routing information according to the service identifier, and forwards the processed packet to a next service node instance or performs normal forwarding according to a routing table, which implements service processing on a packet flow.

Embodiment 6

Figure 7:
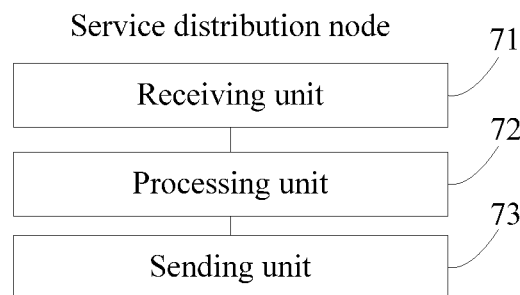
FIG. 7 is a schematic diagram of an apparatus of another service distribution node according to an embodiment of the application.

This embodiment of the application provides a service distribution node. As shown in FIG. 7, FIG. 7 is a schematic diagram of an apparatus of another service distribution node according to this embodiment of the application.

The service distribution node includes a receiving unit 71, a processing unit 72, and a sending unit 73.

The receiving unit 71 is configured to receive service routing information sent by a controller, where the service routing information includes a flow identifier, a service identifier, and a next-hop address, the flow identifier is used to identify a packet flow, the service identifier is used to identify a sequence of a service node instance that processes the packet flow, and the next-hop address is used to identify the service node instance that processes the packet flow.

Optionally, the controller may allocate a service processing policy based on a packet flow. The controller delivers the service routing information to the service distribution node according to a service processing policy corresponding to the packet flow. Packet flows with a same service identifier ID are processed by a same service node instance, and have a same sequence of processing by the service node instance. Further, in specific implementation of this embodiment of the application, if two different service IDs are allocated to two different packets in a same packet flow, it means that although service processing that needs to be performed on the two different packets is the same, the packet flow is processed by different service node instances. In this way, load balancing may be implemented for packet processing. For example, the two different packets are first processed by a firewall, and then processed by a NAT device, but are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The receiving unit 71 is further configured to receive a first packet.

For example, generally, the first packet may be an IP packet or an Ethernet packet, and the first packet may be sent from a user-side device, or may be sent from a network-side device, which is not limited in this embodiment of the application.

The processing unit is configured to: acquire a first flow identifier according to the first packet, and search the service routing information according to the first flow identifier to acquire a matched service identifier and a matched next-hop address; and trigger the sending unit to send a second packet to a first service node instance that has the matched next-hop address, where the second packet is formed by adding the matched service identifier to the first packet.

For example, a packet flow may be identified by using at least one of information of: a source address, a destination address, a source port, a destination port, and a protocol number. Therefore the flow identifier may include at least one of: a source address, a destination address, a source port, a destination port, and a protocol number that are of the first packet. For example, a packet flow is identified by using 5-tuple information (a source address, a destination address, a source port, a destination port, and a protocol number) of the first packet. Optionally, the first flow identifier may be the 5-tuple information of the first packet, or may be a value obtained through calculation by using an algorithm according to the 5-tuple information of the first packet, for example, a value obtained through calculation by using a hash algorithm. When the service distribution node receives the first packet, if the flow identifier in the service routing information is 5-tuple information, the service distribution node 14 acquires the 5-tuple information from the first packet, so as to obtain the first flow identifier. If the flow identifier in the first service routing information is a value obtained through calculation by using a specific algorithm based on the 5-tuple information, the service distribution node 14 acquires the 5-tuple information of the first packet from the first packet, and performs calculation by using the specific algorithm on the 5-tuple information of the first packet to obtain the value, where the obtained value is the first flow identifier.

The sending unit is configured to send the second packet to the first service node instance that has the matched next-hop address.

The second packet is formed by adding the matched service identifier to the first packet. For example, the second packet may be formed by adding the matched service identifier to a header of the first packet, or may be formed by adding the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (Virtual Local Area Network, VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
|---|---|---|---|---|---|

According to the service distribution node provided in this embodiment of the application, the service distribution node adds a service identifier to a received packet according to service routing information, and sends the packet to which the service identifier is added to a service node instance, so that after processing the packet to which the service identifier is added, the service node instance may search the service routing information according to the service identifier and forward the processed packet flow to a next service node instance or perform normal forwarding according to a routing table, which implements service processing on the packet flow.

Embodiment 7

Figure 8:
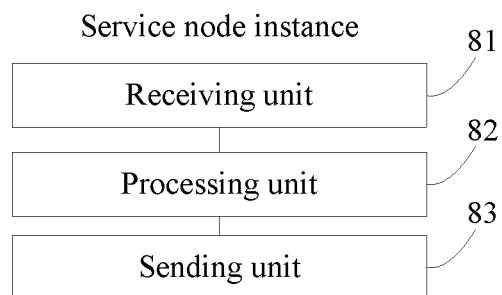
FIG. 8 is a schematic diagram of an apparatus of another service node instance according to an embodiment of the application.

This embodiment of the application provides a service node instance. As shown in FIG. 8, FIG. 8 is a schematic diagram of an apparatus of another service node instance according to this embodiment of the application.

The service node instance includes a receiving unit 81, a processing unit 82, and a sending unit 83.

The receiving unit 81 is configured to receive service routing information sent by a controller, where the service routing information includes a service identifier and a next-hop address, and the service identifier is used to identify a sequence of a service node instance that processes a packet flow.

In specific implementation of this embodiment of the application, the controller may allocate a service processing policy based on a packet flow. The controller delivers the service routing information to service node instances according to a service processing policy corresponding to the packet flow. Packet flows with a same service ID are processed by a same service node instance, and have a same sequence of processing by the service node instance. For example, a packet whose service ID=1 is first processed by a first service node instance 16, and then processed by a second service node instance 18; however, a packet whose service ID=2 is first processed by the second service node instance 18, and then processed by the first service node instance 16. Optionally, if two different service IDs are allocated to two different packets in a same packet flow, it means that although service processing that needs to be performed on the two different packets is the same, for example, first processing by using a firewall and then processing by using a NAT device, the two packets are processed by different service node instances. In this way, load balancing may be implemented for packet processing. Optionally, packets in a packet flow may be classified to implement load balancing of processing on the same packet flow. For example, a same source address and a same destination address are used to identify a same packet flow. To implement load balancing of processing on packets in the same packet flow, the packets in the same packet flow may be classified according to protocol numbers. It is assumed that a service ID is allocated to packets, of which protocol numbers are greater than 50, in the same packet flow, where the service ID is used to identify that the packets are first processed by a firewall instance 1 and then processed by a NAT device instance 1. Another service ID is allocated to packets, of which protocol numbers are less than or equal to 50, in the same packet flow, where the service ID is used to identify that the packets are first processed by a firewall instance 2 and then processed by a NAT device instance 2. In this way, it helps implement load balancing of processing on the same packet flow. Optionally, if same service processing, for example, first processing by a NAT device, and then processing by a firewall, needs to be performed on different packet flows, for example, a packet flow 1 and a packet flow 2, a same service ID may be allocated to packets in the packet flow 1 and packets in the packet flow 2. Certainly and alternatively, different service IDs may be allocated to the packets in the packet flow 1 and the packets in the packet flow 2, which helps implement load balancing.

The first service node instance may be a logical functional entity. It should be noted that a service node instance generally has a reachable address, for example, a reachable IP address or MAC address. In this way, whether a first service node instance is a physical entity or a logical entity is not limited in this embodiment of the application, provided that the first service node instance has a reachable address. In addition, a service node instance providing a firewall function is used as an example for illustration to help understand the service node instance. Generally, a firewall function may be installed on many servers, for example, on virtual machines VMs. In this way, servers on which a firewall function is installed can all provide service processing as a firewall function, and the servers on which a firewall function is installed have different addresses. In this way, each server on which a firewall function is installed may be referred to as a service node instance, that is, each service node instance includes a reachable address and can independently process a service. In specific implementation of this embodiment of the application, the controller determines to select the first service node instance to process the packet flow. For example, the controller may select, according to processing capabilities and service load statuses of service node instances, an appropriate service node instance to process the packet flow.

The receiving unit 81 is further configured to receive a sent first packet, where the first packet carries a service identifier that matches the first packet.

For example, the receiving unit 81 is further configured to receive a first packet sent by a service distribution node or receive a first packet sent by another service node instance.

For example, the service distribution node may add the service identifier that matches the first packet to a header of the first packet, or add the matched service identifier to a payload of the first packet. By using an example in which the first packet is a first Ethernet packet, the matched service identifier may be added to a new header option of the Ethernet packet, or may be added to an IP header of the Ethernet packet; or an existing field in a header of the Ethernet packet may be reused, that is, a meaning of the existing field is changed to indicate that the Ethernet packet carries a service identifier. For example, a VLAN tag (also referred to as a VLAN ID) on a virtual local area network (VLAN for short) or on a QINQ (also referred to as a Stacked VLAN or a Double VLAN), or a label in Multiprotocol Label Switching (MPLS for short) may be reused, or a part or all of a source MAC address may be escaped for reuse. A format of the new header option of the Ethernet packet is as follows: A type field is added between the source MAC address and the VLAN to indicate that the Ethernet packet carries a service identifier (also referred to as a service ID). A format of the service ID in the packet may be shown in Table 1:

| Destination MAC address | Source MAC address | Type | VLAN | Service ID | IP packet |
|---|---|---|---|---|---|

The processing unit 82 is configured to: process the first packet to form a second packet, where the second packet carries the service identifier that matches the first packet; search the service routing information according to the service identifier that matches the first packet to acquire a first next-hop address, where the first next-hop address is a next-hop address that matches the service identifier matching the first packet; and trigger the sending unit 83 to send the second packet to a device that has the first next-hop address.

Preferably, a manner of carrying the service identifier that matches the first packet by the second packet is the same as a manner of carrying the service identifier that matches the first packet by the first packet. How the first service node instance processes the first packet belongs to the prior art; for example, the first service node instance performs NAT processing or firewall processing on the first packet, and details are not described in the application again.

The sending unit 83 is configured to send the second packet to the device that has the first next-hop address.

Optionally, the first packet is a first IP packet, the first next-hop address is a first next-hop IP address, and that the processing unit 82 triggers the sending unit 83 to send the second packet to the device that has the first next-hop address includes: the processing unit 82 searches an ARP table according to the first next-hop IP address to acquire a first MAC address, where the first MAC address is a MAC address that matches the first next-hop IP address; the processing unit 82 uses the first MAC address as a destination MAC address to perform Ethernet encapsulation on the second packet to form a first Ethernet packet; and the processing unit 82 triggers the sending unit 83 to send the first Ethernet packet to a device that has the first MAC address; and correspondingly, that the sending unit 83 is configured to send the second packet to the device that has the first next-hop address includes: the sending unit 83 is configured to send the first Ethernet packet to the device that has the first MAC address.

Optionally, the first packet is a first Ethernet packet, the first next-hop address is a first next-hop IP address, and that the processing unit 82 triggers the sending unit 83 to send the second packet to the device that has the first next-hop address includes: the processing unit 82 searches an ARP table according to the first next-hop IP address to acquire a first MAC address, where the first MAC address is a MAC address that matches the first next-hop IP address; the processing unit 82 replaces a destination MAC address in the second packet with the first MAC address to form a second Ethernet packet; and the processing unit 82 triggers the sending unit 83 to send the second Ethernet packet to a device that has the first MAC address; and correspondingly, that the sending unit 83 is configured to send the second packet to the device that has the first next-hop address includes: the sending unit 83 is configured to send the second Ethernet packet to the device that has the first MAC address.

Optionally, the first packet is a first IP packet, the first next-hop address is a first next-hop MAC address, and that the processing unit 82 triggers the sending unit 83 to send the second packet to the device that has the first next-hop address includes: the processing unit 82 uses the first next-hop MAC address as a destination MAC address to perform Ethernet encapsulation on the second packet to form a third Ethernet packet; and the processing unit 82 triggers the sending unit 83 to send the third Ethernet packet to a device that has the first next-hop MAC address; and correspondingly, that the sending unit 83 is configured to send the second packet to the device that has the first next-hop address includes: the sending unit 83 is configured to send the third Ethernet packet to the device that has the first next-hop MAC address.

Optionally, the first packet is a first Ethernet packet, the first next-hop address is a first next-hop MAC address, and that the processing unit triggers the sending unit 83 to send the second packet to the device that has the first next-hop address includes: the processing unit 82 replaces a destination MAC address in the second packet with the first next-hop MAC address to form a fourth Ethernet packet; and the processing unit 82 triggers the sending unit 83 to send the fourth Ethernet packet to a device that has the first next-hop MAC address; and correspondingly, that the sending unit 83 is configured to send the second packet to the device that has the first next-hop address includes: the sending unit 83 is configured to send the fourth Ethernet packet to the device that has the first next-hop MAC address.

Optionally, the processing unit 82 is further configured to: if the first next-hop address is an unreachable IP address, search a routing table according to a destination IP address in the second packet to acquire a second next-hop IP address, where the second next-hop IP address is a next-hop IP address that is in the routing table and matches the destination IP address; and trigger the sending unit 83 to send a third packet to a device that has the second next-hop IP address, where the third packet is formed by removing the service identifier that matches the first packet and is carried in the second packet; and correspondingly, the sending unit 83 is further configured to send the third packet to the device that has the second next-hop IP address.

After the first service node instance 16 processes the first packet to form the second packet, if other service processing does not need to be performed on the third packet, optionally, in second service routing information delivered by the controller 12, the next-hop address is set to a special next-hop address. For example, the next-hop address may be 0.0.0.0, where 0.0.0.0 is used to indicate that the first service node instance 16 is the last service node instance that processes the first packet. The special next-hop address may be any unreachable IP address, and is not specifically limited in this embodiment of the application, provided that it can indicate that the first service node instance 16 is the last service node instance that processes the first packet.

Optionally, the first packet is a first IP packet, and that the processing unit 82 triggers the sending unit 83 to send the third packet to the device that has the second next-hop IP address includes: the processing unit 82 searches an ARP table according to the second next-hop IP address to acquire a first MAC address, where the first MAC address is a MAC address that matches the second next-hop IP address; the processing unit 82 uses the first MAC address as a destination MAC address to perform Ethernet encapsulation on the third packet to form a fifth Ethernet packet; and the processing unit 82 triggers the sending unit 83 to send the fifth Ethernet packet to a device that has the first MAC address; and correspondingly, that the sending unit 83 is further configured to send the third packet to the device that has the second next-hop IP address includes: the sending unit 83 is further configured to send the fifth Ethernet packet to the device that has the first MAC address.

Optionally, the first packet is a first Ethernet packet, and that the processing unit 82 triggers the sending unit 83 to send the third packet to the device that has the second next-hop IP address includes: the processing unit 82 searches an ARP table according to the second next-hop IP address to acquire a first MAC address, where the first MAC address is a MAC address that matches the second next-hop IP address; the processing unit 82 replaces a destination MAC address in the third packet with the first MAC address to form a sixth Ethernet packet; and the processing unit 82 triggers the sending unit 83 to send the sixth Ethernet packet to a device that has the first MAC address; and correspondingly, that the sending unit 83 is further configured to send the third packet to the device that has the second next-hop IP address includes: the sending unit 83 sends the sixth Ethernet packet to the device that has the first MAC address.

Optionally, the first packet is an IP packet, the first next-hop address is a first next-hop MAC address, and the processing unit 82 is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; use the first MAC address as a destination MAC address to perform Ethernet encapsulation on the second packet to form a seventh Ethernet packet, where the seventh Ethernet packet does not carry the service identifier that matches the first packet; and trigger the sending unit 83 to send the seventh Ethernet packet to a device that has the first MAC address; and correspondingly, the sending unit 83 is further configured to send the seventh Ethernet packet to the device that has the first MAC address.

Optionally, the first packet is an Ethernet packet, the first next-hop address is a first next-hop MAC address, and the processing unit 82 is further configured to: if the first next-hop MAC address is an unreachable MAC address, search a routing table according to a destination IP address in the second packet to acquire a second next-hop IP address, where the second next-hop IP address is a next-hop IP address that matches the destination IP address; search an ARP table to acquire a first MAC address, where the first MAC address is a MAC address that matches the second next-hop IP address; replace a MAC address in the second packet with the first MAC address to form an eighth Ethernet packet, where the eighth Ethernet packet does not carry the service identifier that matches the first packet; and trigger the sending unit 83 to send the eighth Ethernet packet to a device that has the first MAC address; and correspondingly, the sending unit 83 is further configured to send the eighth Ethernet packet to the device that has the first MAC address.

Optionally, the service routing information further includes control flag information, the control flag information is used to indicate whether the packet flow has reached the last service node instance and whether normal routing and forwarding need to be performed, and the processing unit 82 is further configured to: when searching the service routing information, acquire matched control flag information; and if the matched control flag information indicates that the first packet has reached the last service node instance and normal routing and forwarding need to be performed, trigger the sending unit 83 to send a fourth packet to the device that has the first next-hop address, where the fourth packet is formed by removing the service identifier that matches the first packet and is carried in the second packet.

For example, in the second service routing information delivered by the controller 12, a control flag bit may be set to indicate that the first packet has reached the last service node instance and normal routing and forwarding need to be performed. In this way, the first service node instance 16 searches the second service routing information according to the service identifier that matches the first packet to acquire the matched control flag information. The control flag information may be represented by a control flag bit; for example, when the control flag bit is 0, it indicates that the first packet needs to be processed by a next service node instance, or when the control flag bit is 1, it indicates that the first packet has reached the last service node instance and normal routing and forwarding need to be performed. A manner in which the control flag information is identified is not specifically limited in this embodiment of the application, provided that it can indicate that the first packet has reached the last service node instance and normal routing and forwarding need to be performed.

Correspondingly, the sending unit 83 is further configured to send the fourth packet to the device that has the first next-hop address.

Optionally, the first packet is a first IP packet, the first next-hop address is a first next-hop IP address, and that the processing unit 82 triggers the sending unit 83 to send the fourth packet to the device that has the first next-hop address includes: the processing unit 82 searches an ARP table according to the first next-hop IP address to acquire a second MAC address, where the second MAC address is a MAC address that matches the first next-hop IP address; uses the second MAC address as a destination MAC address to perform Ethernet encapsulation on the fourth packet to form a ninth Ethernet packet; and triggers the sending unit 83 to send the ninth Ethernet packet to a device that has the second MAC address; and correspondingly, that the sending unit 83 is further configured to send the fourth packet to the device that has the first next-hop address includes: the sending unit 83 is further configured to send the ninth Ethernet packet to the device that has the second MAC address.

Optionally, the first packet is a first Ethernet packet, the first next-hop address is a first next-hop IP address, and that the processing unit 82 triggers the sending unit 83 to send the fourth packet to the device that has the first next-hop address includes: the processing unit 82 searches an ARP table according to the first next-hop IP address to acquire a second MAC address, where the second MAC address is a MAC address that matches the first next-hop IP address; replaces a destination MAC address in the fourth packet with the second MAC address to form a tenth Ethernet packet; and triggers the sending unit 83 to send the tenth Ethernet packet to a device that has the second MAC address; and correspondingly, that the sending unit 83 is further configured to send the fourth packet to the device that has the first next-hop address includes: the sending unit 83 is further configured to send the tenth Ethernet packet to the device that has the second MAC address.

Optionally, the first packet is an IP packet, the first next-hop address is a first next-hop MAC address, and that the processing unit 82 triggers the sending unit 83 to send the fourth packet to the device that has the first next-hop address includes: the processing unit 82 uses the first next-hop MAC address as a destination address to perform Ethernet encapsulation on the fourth packet to form an eleventh Ethernet packet; and triggers the sending unit 83 to send the eleventh Ethernet packet to a device that has the first next-hop MAC address; and correspondingly, that the sending unit 83 is further configured to send the fourth packet to the device that has the first next-hop address includes: the sending unit 83 is further configured to send the eleventh Ethernet packet to the device that has the first next-hop MAC address.

Optionally, the first packet is an Ethernet packet, the first next-hop address is a first next-hop MAC address, and that the processing unit 82 triggers the sending unit 83 to send the fourth packet to the device that has the first next-hop address includes: the processing unit 82 replaces a destination MAC address in the second packet with the first next-hop MAC address to form a twelfth Ethernet packet; and triggers the sending unit 83 to send the twelfth Ethernet packet to a device that has the first next-hop MAC address; and correspondingly, that the sending unit 83 is further configured to send the fourth packet to the device that has the first next-hop address includes: the sending unit 83 is further configured to send the twelfth Ethernet packet to the device that has the first next-hop MAC address.

The service node instance provided in this embodiment of the application receives a packet that carries a service identifier, processes the packet, searches service routing information according to the service identifier, and forwards the processed packet to a next service node instance or performs normal forwarding according to a routing table, which implements service processing on a packet flow.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A method, comprising:
    obtaining, by a controller, a first flow identifier, a first service identifier, and a first next-hop address, wherein the first flow identifier uniquely identifies a packet flow, the first service identifier is uniquely allocated to the packet flow, the first service identifier identifies a sequence of a plurality of service node instances that process the packet flow, and the first next-hop address identifies the address of a first service node instance of the plurality of service node instances that processes the packet flow; and
    sending, by the controller, the first flow identifier, the first service identifier and the first next-hop address to a service distribution node.

2. The method according to claim 1, further comprising:
    obtaining, by the controller, a second next-hop address, wherein the second next-hop address identifies the address of the first service node instance that processes the packet flow; and
    sending, by the controller, the first service identifier and the second next-hop address to a second service node instance.

3. The method according to claim 1, wherein the first flow identifier comprises 5-tuple information of the packet flow.

4. The method according to claim 1, wherein the address of the first service node instance is an IP address of the first service node instance.

5. A controller, comprising:
    a processor; and
    a transmitter;
    wherein the processor is configured to:
        obtain a first flow identifier, a first service identifier, and a first next-hop address, wherein the first flow identifier uniquely identifies a packet flow, the first service identifier is uniquely allocated to the packet flow, the first service identifier identifies a sequence of a plurality of service node instances that process the packet flow, and the first next-hop address identifies an address of a first service node instance of the plurality of service node instances that processes the packet flow; and
    wherein the transmitter is configured to send the first flow identifier, the first service identifier, and the first next-hop address to a service distribution node.

6. The controller according to claim 5, wherein the processor is further configured to:
    obtain a second next-hop address, wherein the second next-hop address identifies the address of the first service node instance that processes the packet flow; and
    wherein the transmitter is further configured to send the first service identifier and the second next-hop address to a second service node instance of the plurality of service node instances.

7. The controller according to claim 5, wherein the first flow identifier comprises 5-tuple information of the packet flow.

8. The controller according to claim 5, wherein the address of the first service node instance is an IP address of the first service node instance.

9. A non-transitory computer readable storage medium storing instructions that, when executed by a processor, cause a computer to:
    obtain a first flow identifier, a first service identifier, and a first next-hop address, wherein the first flow identifier uniquely identifies a packet flow, the first service identifier is uniquely allocated to the packet flow, the first service identifier identifies a sequence of a plurality of service node instances that process the packet flow, and the first next-hop address identifies an address of a first service node instance of the plurality of service node instances that processes the packet flow; and
    send, using a transmitter, the first flow identifier, the first service identifier, and the first next-hop address to a service distribution node.

10. The non-transitory computer readable storage medium according to claim 9, wherein the instructions, when executed by the processor, further cause the computer to:
    obtain a second next-hop address, wherein the second next-hop address identifies the address of the first service node instance that processes the packet flow; and
    send, using the transmitter, the first service identifier and the second next-hop address to a second service node instance of the plurality of service node instances.

11. The non-transitory computer readable storage medium according to claim 9, wherein the first flow identifier comprises 5-tuple information of the packet flow.

12. The non-transitory computer readable storage medium according to claim 9, wherein the address of the first service node instance is an IP address of the first service node instance.

* * * * *